United States Patent [19]
Carlucci et al.

[11] Patent Number: 5,412,773
[45] Date of Patent: May 2, 1995

[54] COMPUTERIZED INTERACTIVE MENU-DRIVEN VIDEO SIGNAL PROCESSING APPARATUS AND METHOD

[75] Inventors: John B. Carlucci, Milpitas; Jon E. Graham, San Jose; Douglas D. Kuper, Campbell; Kathlynn K. Uenaka, San Jose; David C. Collier, Gilroy, all of Calif.

[73] Assignee: Sony Electronics Inc., Park Ridge, N.J.

[21] Appl. No.: 794,489

[22] Filed: Nov. 19, 1991

[51] Int. Cl.⁶ .......................... G06F 3/14; H04N 3/36
[52] U.S. Cl. .................................... 395/156; 395/161; 348/552; 348/97; 348/104
[58] Field of Search ............... 395/156, 161, 155, 159, 395/154, 153; 358/214, 54, 903, 335; 348/552, 97, 101, 104

[56] References Cited

U.S. PATENT DOCUMENTS

| | | | |
|---|---|---|---|
| 4,096,523 | 6/1978 | Belmares-Sarabia et al. | 358/80 |
| 4,272,780 | 6/1981 | Belmares-Sarabia et al. | 358/54 |
| 4,418,358 | 11/1983 | Poetsch et al. | 358/80 |
| 4,754,342 | 6/1988 | Duffy | 360/14.3 |
| 4,763,186 | 8/1988 | Belmares-Sarabia et al. | 358/22 |
| 4,857,994 | 8/1989 | Belmares-Sarabia et al. | 358/22 |
| 4,862,251 | 8/1989 | Belmares-Sarabia et al. | 358/22 |
| 4,866,511 | 9/1989 | Belmares-Sarabia et al. | 358/27 |
| 5,012,334 | 4/1991 | Etra | 358/903 X |
| 5,109,482 | 4/1992 | Bohrman | 395/154 |
| 5,119,474 | 6/1992 | Beitel et al. | 395/161 X |
| 5,191,645 | 3/1993 | Carlucci et al. | 395/159 |
| 5,206,929 | 4/1993 | Langford et al. | 395/159 |

OTHER PUBLICATIONS

Sales brochure for color correction system by daVinci, Oct. 1987. (8 sheets).
Sales brochure for "SoftVTR" by Chase Technologies (2 sheets), obtained at Chase Technologies' display booth at SIGGRAPH conference in Aug. 1991.

*Primary Examiner*—Raymond J. Bayerl
*Attorney, Agent, or Firm*—Limbach & Limbach; Mark A. Dalla Valle

[57] ABSTRACT

A computerized interactive menu-driven video signal processing apparatus and method for selectively converting and processing color video signals from a color film scanner includes and provides a method for using a film scanner, a video color signal processor, a video signal storage device (e.g. high definition video tape recorder) and a computer with an interactive menu-driven operator control interface. The operator interface includes an alphanumeric keypad, a computer "mouse," a graphics display and a video monitor. While viewing analytical data (e.g. film masking coefficients, model film dye characteristic curves) on the graphics display and video images on the video monitor, the operator enters data and commands into the computer via the alphanumeric keypad or mouse to control the film scanner, the video color signal processor and the video signal storage device. Thus, the operator can precisely and interactively control every aspect of the video conversion and signal processing, including the scanning of the film, the actual video signal processing, and the storage and retrieval of the selectively processed video.

50 Claims, 19 Drawing Sheets

FIG. 3B

| COLOR CORRECTION COMPONENTS | |
|---|---|
| GAIN & BIAS | ▓▓▓ |
| FILM: | ☐ |
|     MASKING COEFFICIENTS | ☐ |
|     CHARACTERISTIC CURVE | ▓▓▓ |
|         GAMMA | ▓▓▓ |
|         MAXIMUM DENSITY | ▓▓▓ |
|         MINIMUM DENSITY | ☐ |
|         INERTIAL POINT | ☐ |
|         SHOULDER CURVATURE | ▓▓▓ |
|         TOE CURVATURE | ☐ |
| VIDEO: | |
|     CROSS-TALK COEFFICIENTS | ▓▓▓ |
|     TRANSFER FUNCTION | ☐ |
| SELECT ALL COMPONENTS | ☐ |

FIG. 5A

COMPUTERIZED INTERACTIVE MENU-DRIVEN VIDEO SIGNAL PROCESSING APPARATUS AND METHOD

BACKGROUND OF THE INVENTION

1. Field of the Invention

The present invention relates to processors for video signals, and in particular, to video signal processors in which processing of video signals originating from a film scanner or a video storage device is controlled via a computerized interactive menu-driven operator control interface.

2. Description of the Related Art

Conventional film scanners and color correction systems, such as telecines, are well known and widely used. A light source is used to illuminate a film frame, thereby producing an optical film image. The optical film image is color filtered to separate the polychromatic optical film image into its constituent monochromatic optical film images. For example, red, green and blue color filters are typically used to separate the polychromatic optical film image into red, green and blue optical film images for independent or individual processing. Each of these red, green and blue optical film images is projected onto a photosensor, i.e. "imager," for conversion into electronic red, green and blue video color signals. These video color signals may then each be processed (e.g. color corrected), recorded onto a recording medium such as a tape or disk, and subsequently recombined to reproduce a polychromatic video image.

In processing the video image signals, scanning the film or reproducing the recorded video image signals, numerous controls and adjustments must be exercised. For example, video image signal processing, such as color processing or manipulation, often requires that specific features or characteristics of the video image signals, such as color saturation or hue, be precisely manipulated on a local or global scale. Further, it is often desirable to scan the film or reproduce prerecorded video image signals repeatedly or at different speeds to make interactive corrections or modifications to produce alternative images.

To do any of the foregoing, it is necessary to somehow control the devices which produce, process or reproduce the film or image signals, i.e. the scanner, processor and video storage device. Such control is generally exercised by directly manipulating hardware oriented controls, such as levers, buttons, dials or joysticks. However, these types of controls are generally electromechanical in nature and not as precise or accurate as would otherwise be desired. Thus, it is difficult to precisely and accurately process, produce or reproduce a specific portion of a film or video image signal. Further, it is difficult to alter or manipulate specific features or characteristics of a video image signal, such as a selected portion of its color space, or to cue the film or video image signal to a specific point.

Some computerized systems have been developed, but are limited in what they can do with respect to controlling the processing of video signals. For example, one system provides a computerized status monitor which provides the operator with textual information regarding status of various film or video parameters. Another system provides software for emulating the controls of a video tape recorder on a display screen. However, neither system provides for complete and direct control over the video signal processing or cuing.

SUMMARY OF THE INVENTION

A computerized interactive menu-driven video signal processing apparatus and method in accordance with the present invention includes an apparatus for providing, and a method for using, a computerized interactive menu-driven operator control interface to selectively process a video signal. The present invention further includes an apparatus for providing, and a method for using, a computerized interactive menu-driven operator control interface to selectively cue film images or video signals by defining film and video frames and scenes. The present invention thereby allows selected portions of film images or video signals to be precisely and accurately processed, reproduced and cued.

A preferred embodiment of the present invention includes processor means for receiving a video signal and computerized signal processing control data, and for selectively processing the video signal in accordance with the computerized signal processing control data; and further includes computer means for providing a first operator feedback signal representing a first pictographic menu display depicting a first operator control command corresponding to the computerized signal processing control data, for receiving a first control signal corresponding to the first operator control command, and for providing the computerized signal processing control data to the processor means in accordance with the first control signal.

An alternative embodiment of the present invention includes computer means for providing a second operator feedback signal representing a second pictographic menu display depicting a second operator control command corresponding to computerized video storage and retrieval instructions, for receiving a second control signal corresponding to the second operator control command, and for providing the computerized video storage and retrieval instructions in accordance with the second control signal.

Another alternative embodiment of the present invention includes computer means for providing a third operator feedback signal representing a third pictographic menu display depicting a third operator control command corresponding to a computerized film scanning instruction, for receiving a third control signal corresponding to the third operator control command, and for providing the computerized film scanning instruction in accordance with the third control signal.

These and other features and advantages of the present invention will be understood upon consideration of the following detailed description of the invention and the accompanying drawings.

BRIEF DESCRIPTION OF THE DRAWINGS

FIGS. 3A–3B illustrate pictographic menu displays used for interactive control of film transfer characteristic curves and film masking matrix coefficients within the system of FIG. 1.

FIGS. 5A–5D illustrate pictographic menu displays used for the interactive control of the color space within the video color signals of the system of FIG. 1.

DETAILED DESCRIPTION OF THE INVENTION

The present invention can be embodied or practiced in accordance with the apparatuses and methods disclosed in each of the following commonly assigned, co-pending patent applications, the specifications of which are hereby incorporated herein by reference: "Non-Real-Time Film Scanning System," filed by Capitant et al. on Aug. 7, 1991, under Ser. No. 07/741,329, now U.S. Pat. No. 5,321,500; "Film Scanning Apparatus and Method," filed by Galt et al. on Mar. 29, 1991 under Ser. No. 07/677,578, now abandoned; "Digital Color Correction System and Method," filed by Capitant et al. on Jun. 5, 1991 under Ser. No. 07/710,704, now U.S. Pat. No. 5,255,083; and "Film-To-Video Frame Image Conversion Apparatus and Method for Selectively Identifying Video Fields and Frames," filed by Capitant et al. on May 14, 1991 under Ser. No. 07/699,928, now U.S. Pat. No. 5,260,787.

Figure 1:
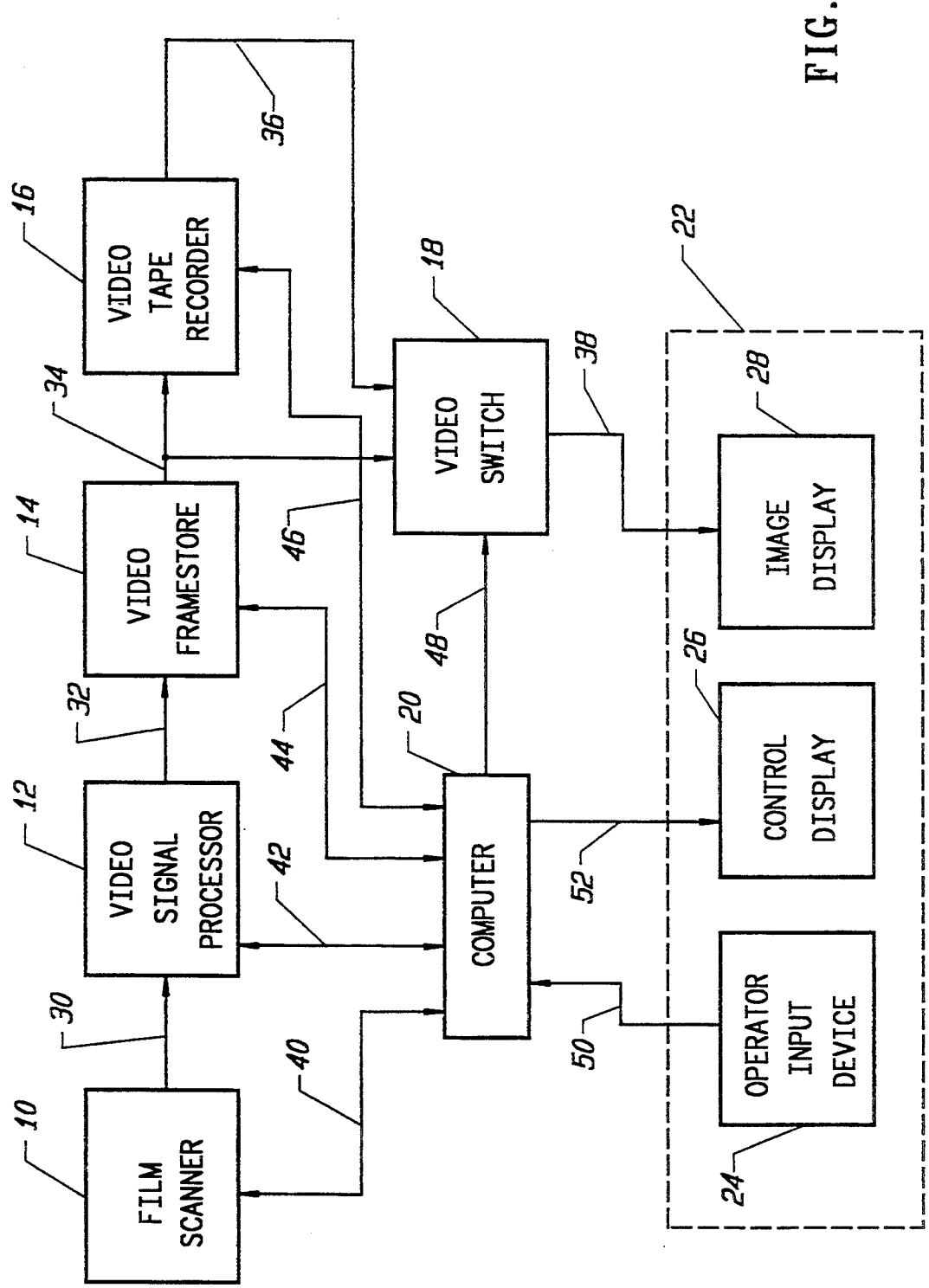
FIG. 1 is a functional block diagram of a computerized interactive menu-driven video signal processing apparatus in accordance with the present invention.

Referring to FIG. 1, a computerized interactive menu-driven video signal processing apparatus in accordance with the present invention includes: a film scanner 10; a video signal processor 12; a video framestore 14; a video tape recorder 16; a video switch 18; a computer 20; and an operator interface 22, all connected substantially as shown. Further, the operator interface 22 includes an operator input device 24, a control display 26 and an image display 28.

In accordance with the disclosures of the aforementioned patent applications incorporated herein by reference, the film scanner 10 optically scans a polychromatic optical film image, and separates it into its constituent monochromatic optical film images. These monochromatic optical film images are outputted in the form of an analog high definition ("HD") video signal 30. Further in accordance with the disclosures of the aforementioned patent applications incorporated herein by reference, the video signal processor 12 receives the analog HD video signal 30, digitizes it and processes (e.g. color corrects) it to produce a digital processed HD video color image signal 32.

This digital processed video color image signal 32 is initially stored in the video framestore 14. The stored signal is retrieved and outputted for longer term storage by the video tape recorder 16.

The video color image signals 34, 36 from the video framestore 14 and video tape recorder 16 are inputted to the video switch 18 for selective switching to produce a switched video signal 38 comprising one of the inputted video color image signals 34, 36.

As discussed in more detail below, each of the aforementioned system elements 10, 12, 14, 16, 18 are under interactive control by the computer 20. Each of these elements 10, 12, 14, 16, 18 receives a control signal 40, 42, 44, 46, 48 from the computer 20. The interface signals 40, 42, 44, 46, 48 between the computer 20 and the interactively controlled elements 10, 12, 14, 16, 18 are transferred over interface lines, e.g. in accordance with the RS-232 or RS-422 standards.

In turn, the computer 20 receives control signals 50 representing operator control commands (discussed further below) via the operator input device 24. Further, the computer 20 provides operator feedback signals 52 representing pictographic menu displays (discussed further below) depicting the operator control commands to a control display 26 within the operator interface 22. As will become more evident in the following discussion, the operator interface 22 (i.e. the operator input device 24, control display 26 and image display 28) and the computer 20 comprise a computerized interactive menu-driven operator control interface for interactively controlling the video signal processing and other functions of the system of FIG. 1.

Figure 2:
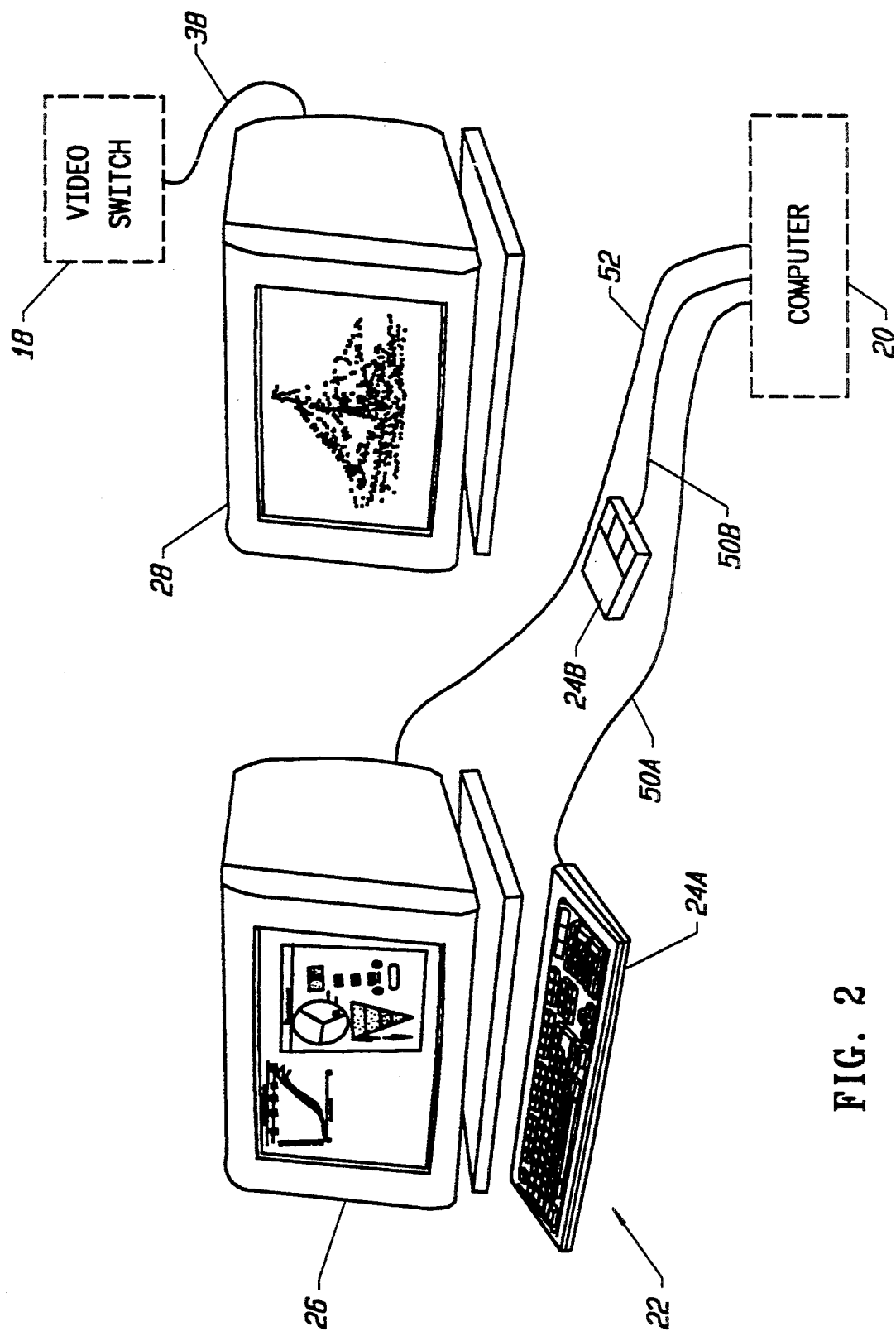
FIG. 2 is a pictorial representation of the operator interface devices of FIG. 1.

Referring to FIG. 2, a preferred embodiment of the operator interface 22 includes an alphanumeric keypad 24a and computer "mouse" 24b as the operator input device 24. The control display 26 comprises a graphics monitor and the image display 28 comprises a video monitor. As discussed in more detail below, the alphanumeric keypad 24a or the mouse 24b are used to input control data or instructions to the computer 20, while the operator views feedback data on the graphics monitor 26 and video images on the image display 28.

The system of FIG. 1 performs, among others, two major functions: color adjustment and electronic film-to-video image transfer. The color adjustment provided by the video signal processor 12 provides for image-wide modification of color values, including compensation for variations in film and HD video transfer characteristics, as well as color variations due to film aging. In accordance with the aforementioned patent application entitled "Digital Color Correction System and Method," the video signal processor 12 uses models which account for the film transfer characteristics and the film-to-video transfer system, i.e. from the CCD image capture within the film scanner 10 to the image display 28. As discussed further below, the electronic image transference, i.e. the capture, packaging and transfer of film frames to HD video tape, can be accomplished interactively and more intuitively, thereby allowing the operator to perform transfers with minimal training.

An editor, or "colorist," bases color adjustment decisions on visual information from a display of the transferred HD video image and on technical information regarding the character of the film being transferred. The displayed HD video image is the result of the combined transfer characteristics of both the film and the transfer system. A model of the film transfer characteristics dependent upon the chemical behavior of film dyes during exposure is used. A linear section of the film model accounts primarily for the transfer system from the scanner sensors in the film scanner 10 to the image display 28.

For color adjustment, the operator is provided with both subjective and analytical feedback. The image display 28 provides the subjective feedback in the form of the image being processed. On the image display 28, portions of a "current frame" and a "matching frame" may be displayed. The term "current frame" refers to the film frame which is having its color content adjusted. The term "matching frame" is the frame used as a reference frame to allow comparisons between two colors within two frames during color adjustment. Both the current and matching frames are displayed on the image display 28 (discussed further below). Wipe controls determine which portions of each frame are visible.

Analytical feedback is provided by the computer 20 in the form of two sets of curves, i.e. via displays on the control display 26, with one set of curves corresponding to film transfer characteristics and the other corresponding to the system transfer function. The term "system" refers to the non-film components of the transfer system. Analytical feedback from the computer 20 is displayed on the control display 26 in the form of various operator interface displays, as illustrated in FIGS. 3 through 12 and discussed further below, for providing for interactive control of the elements 10, 12, 14, 16, 18 discussed above for the system of FIG. 1. As discussed below, the various controls can be exercised by entering data or commands directly via the alphanumeric keypad 24a, or by manipulation of various display icons (e.g. "grabbing" and "dragging") with a display cursor and the mouse 24b.

As discussed immediately below, FIGS. 3–5 illustrate various pictographic menu displays depicting various operator control commands which correspond to computerized signal processing control data 42 to be transferred from the computer 20 to the video signal processor 12 in accordance with control signals 50 from the operator input device 24.

Figure 3A:
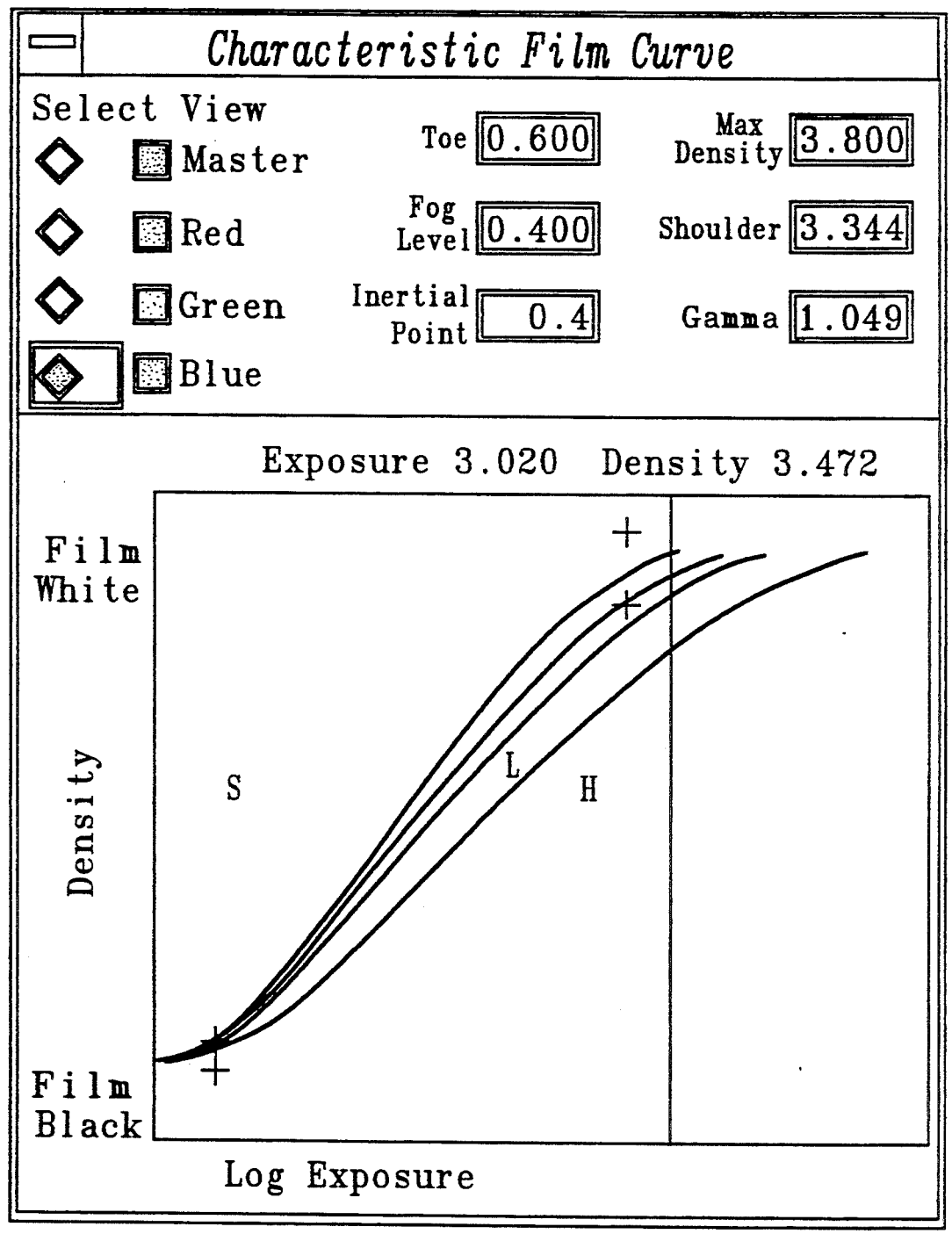

Referring to FIG. 3A, the curves for modeling film transfer characteristics plot film dye density versus exposure (logarithmic) for red, green and blue film dye. Values for gamma, speed, fog level, toe curvature, shoulder curvature and maximum density are displayed for the currently selected curve (e.g. blue). The curve selected for modification is given a number of control points for grabbing and dragging via the display cursor and mouse 24b.

Figure 3B:
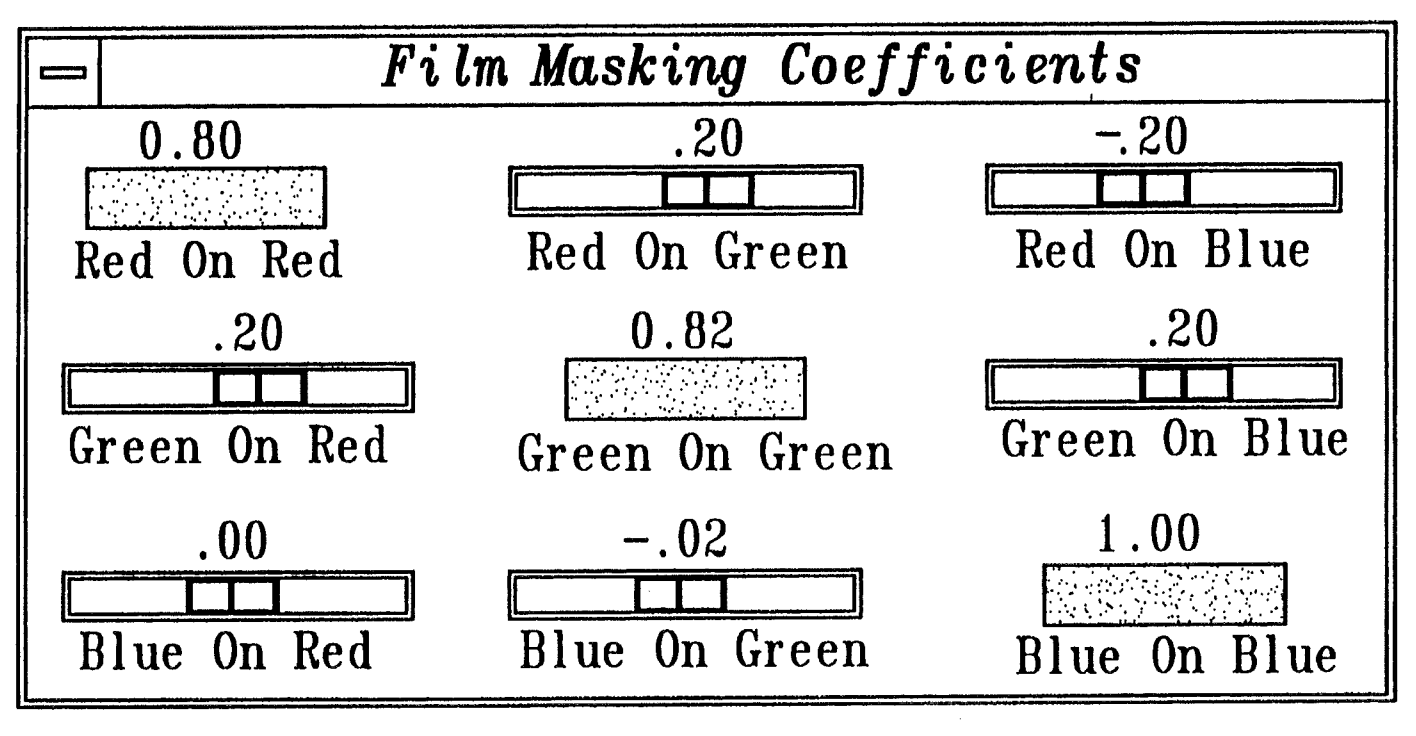

Referring to FIG. 3B, the effects of film dye crosstalk between the red, green and blue color components of the image can be changed through film masking coefficient controls. These coefficients operate in the logarithmic domain. Masking coefficient values ranging from −1.0 through +1.0 may be set. The film masking coefficients operating on a single color component must sum to 1.0; therefore, the range of the "red on red," "green on green," and "blue on blue" coefficients is −1.0 through +1.0. The coefficients' values can be individually controlled within their respective ranges by directly entering values therefor via the alphanumeric keypad 24a, or by grabbing and dragging the coefficients' respective "sliders" with the display cursor and mouse 24b.

A reference color is provided for each color component. This color results from applying the film masking matrix to an input vector (e.g. R, G, B). Some preliminary testing and evaluation of various combinations of the input vector, to see which provides the best intuitive feedback, is typically done first. The reference color provides additional visual feedback on the shift in color resulting from changing the coefficients.

Figure 4A:
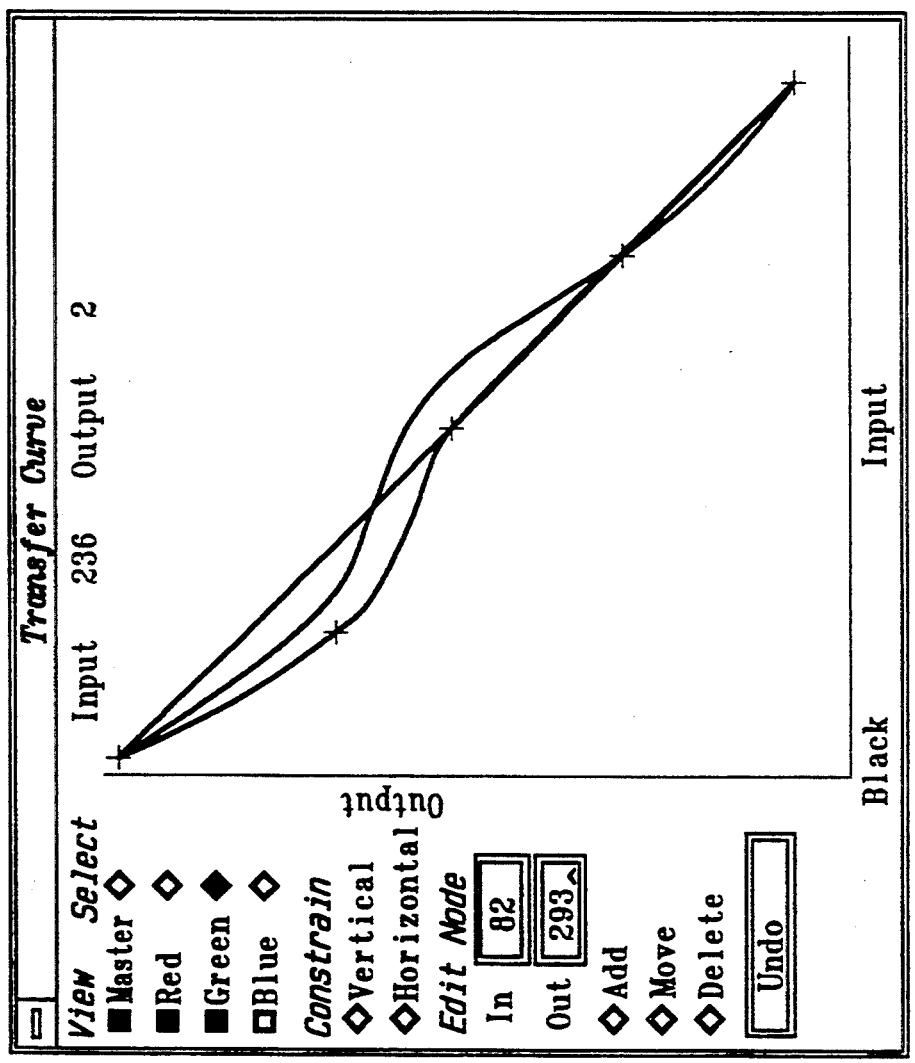
FIGS. 4A–4B illustrate pictographic menu displays used for the interactive control of system transfer functions and crosstalk coefficients for the non-film portion of the system of FIG. 1.

Referring to FIG. 4A, the system transfer function is a plot of the normalized output video signal 32 versus the normalized input signal 30 in the linear domain. The curve selected for modification (e.g. red, green or blue) is given a number of control points for grabbing and dragging via the display cursor and mouse 24b.

Figure 4B:

Referring to FIG. 4B, the effects of crosstalk between the red, green and blue components of the system can be controlled by modifying the transfer system crosstalk coefficients. New values can be entered directly via the alphanumeric keypad 24a, or the existing values can be changed by grabbing and dragging the sliders with the display cursor and mouse 24b. These controls behave in a manner similar to those for the film masking coefficients discussed above; however, they operate in the linear domain rather than the logarithmic domain.

Several methods can be used for altering the color of the current frame. The characteristic film curves permit color adjustment directed by the film model, while the system transfer function curves provide more liberal, or "artistic," color control. The operator can directly modify the film characteristic curves (FIG. 3A) to alter the current frame color content resulting from a given input exposure. In the horizontal direction, the film characteristic curves are subdivided into three sections corresponding the highlight region H, the linear region L and the shadow region S. The sizes of these regions H, L, S are controlled by moving the curves' control points horizontally, parallel to the logarithmic exposure axis. Maximum density and fog level may be modified by editing the values in their respective text fields (via the alphanumeric keypad 24a). A density offset and a logarithmic exposure offset can be used to shift each curve along the vertical and horizontal axes, respectively. Similarly, the system transfer curves (FIG. 4A) can be modified. An output offset and an input offset can be used to shift the curves vertically and horizontally, respectively, and values may be entered for the maximum and minimum output.

Referring to FIG. 5A, the color adjustment models can be tuned using analysis type controls. The operator specifies which parts of the models (e.g. gain and bias, selected film parameters or selected video parameters) are to be held fixed and which are to be allowed to vary. Each shaded box represents a toggle between fixed and variable for the corresponding component's value. "Select All Components" sets all components to be adjusted to fit control points. The components are ordered for sequential control point fitting by priority: (1) "Gain & Bias"; (2) Video "Cross-Talk Coefficients"; (3) Film "Masking Coefficients"; (4) Film "Characteristic Curve"; and (5) Video "Transfer Function". Also prioritized for control point fitting are the parameters of the film characteristic curve: (1) "Gamma"; (2) "Inertial Point"; (3) "Maximum Density"; (4) "Minimum Density"; (5) "Shoulder Curvature"; and (6) "Toe Curvature".

Figure 5B:
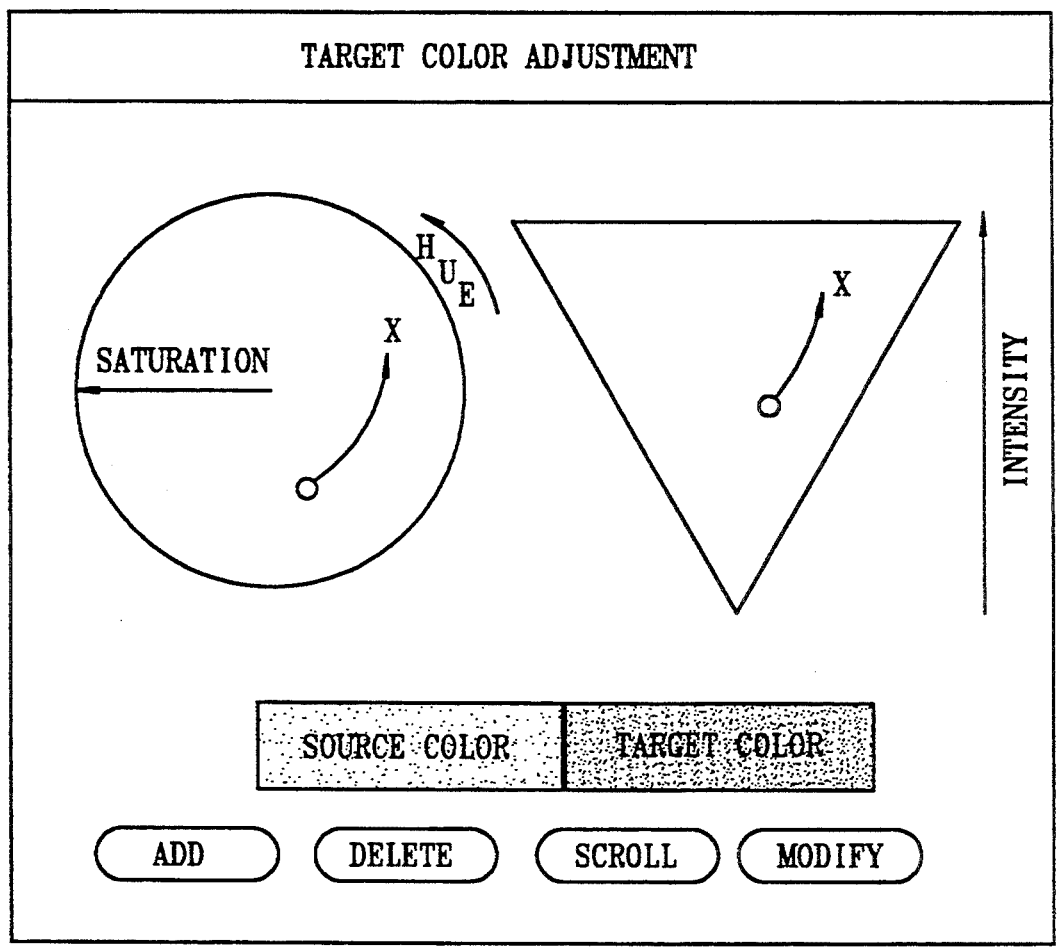

Referring to FIG. 5B, a hue, saturation and intensity representation of the color space (e.g. based upon CIE-LAB or other suitable color models) is provided in which the operator can select and move colors within the space. The operator selects a "Source Color" (i.e. a color to be altered) from either the image display 28 or the color space. The selected color is displayed in a window as the original color. The operator can then alter the color by increasing or decreasing its hue, saturation or intensity. The modified color appears in a window beside the original color. A "Target Color" can also be selected from either the image display 28 or from the color space representation. Both the image displayed on the image display 28 and the characteristic curves (as displayed on the control display 26) are updated to reflect the color adjustments.

Pairs of color points are selected by pointing at the corresponding row in the source/target color selection table, with the selection being designated by shading of the selected row. The selected point pair is also displayed graphically. "Add" causes the next blank line in the table to be selected, whereupon the operator can select the source and target colors either graphically (by pointing with the cursor) or by directly entering numerical values into the table. The selected color correction components and all source points are then updated, as is the selected point graphically.

"Delete" causes the currently selected source/target color pair to be deleted from the list, and the selected color corrector components (FIG. 5A) and source color point values to be recalculated and updated, respectively, using the new model. Previous color corrector parameters can be restored by "Adding" and "Deleting" the same point. "Scroll" causes the list of numerical points to be scrolled to enable virtual screen listings. "Modify" allows selected target point pairs to be modified, either graphically (by pointing with the cursor) or directly by entering numerical values into the table. Source points cannot be modified. To modify a source point, its point pair must be deleted and a new point pair entered. To avoid visual confusion, only the selected point pair is displayed graphically.

Figure 5C:
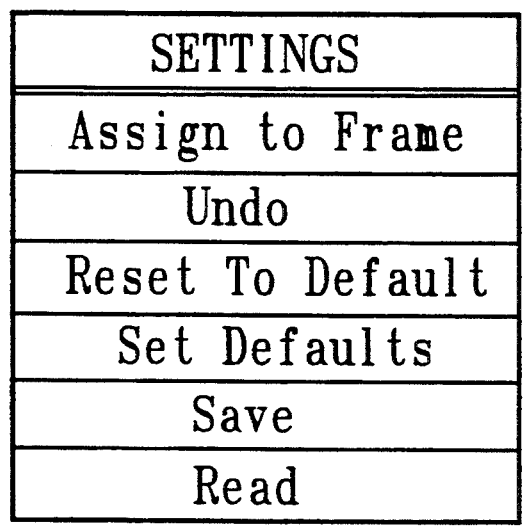
Figure 5D:
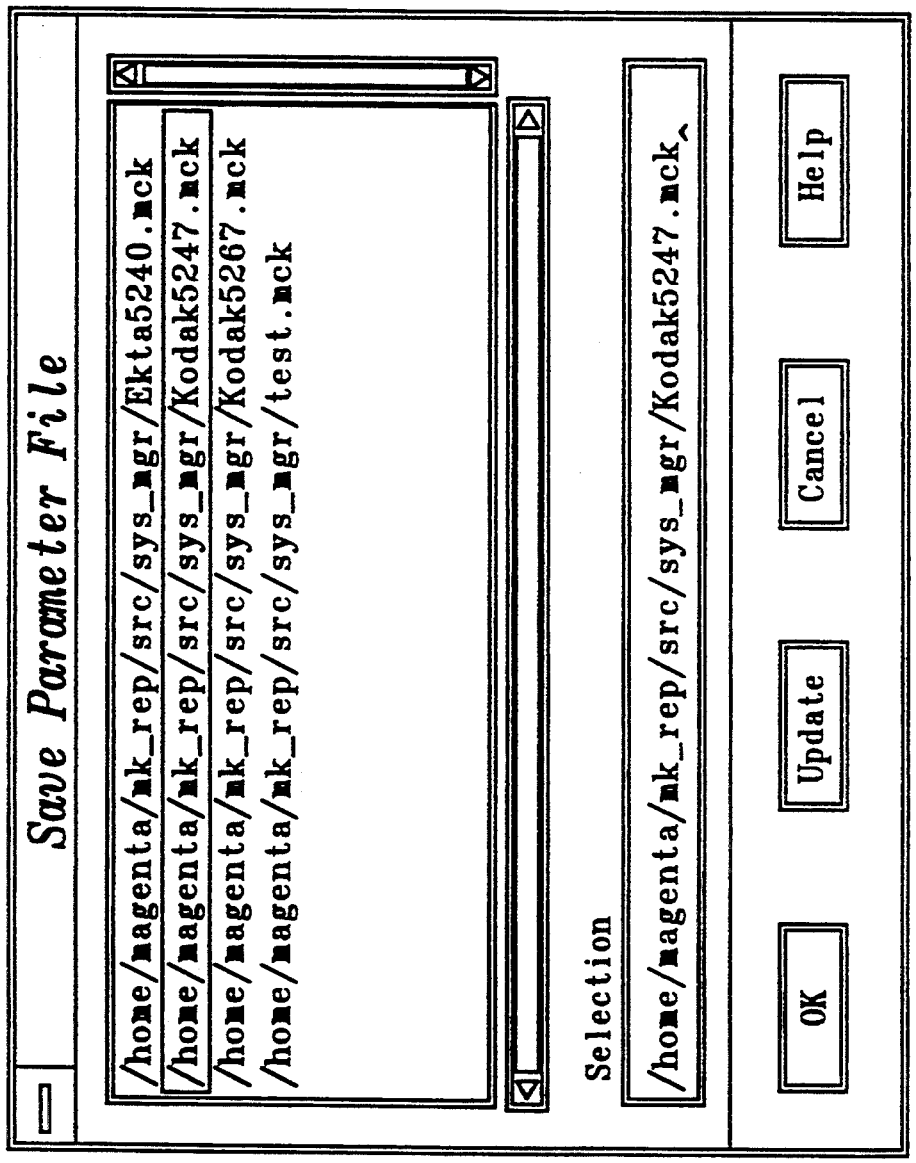

Referring to FIGS. 5C and 5D, once desirable color adjustment settings are achieved, they may be assigned to a film frame using the "Assign to Frame" button. Any previously assigned color adjustment settings are overwritten. Such assignments can be revoked using the "Undo" button. The settings may also be used as new default color adjustment settings using the "Set Defaults" button. The "Reset to Default" button invokes the default color adjustment. Color adjustment settings can also be saved to a file with an operator-specified name, and can be read, i.e. retrieved, during future transfer sessions.

Film frames are transferred via the video tape recorder 16 (FIG. 1) to HD video tape. To compensate for the film and system transfer, characteristic color adjustment must be applied to the film frames. To facilitate non-real-time transfer, film frames are transferred to HD video tape in units called "scenes." Within these units, or scenes, the color adjustments are set interactively based upon one or more representative frames. A scene is defined by start and end indices. Color reference frames are used to set the color adjustment settings for all the frames within a scene.

As discussed immediately below, FIGS. 6–9 illustrate various pictographic menu displays depicting various operator control commands which correspond to computerized video storage and retrieval instructions 44 and 46 to be transferred to the video framestore 14 and video tape recorder 16, respectively, and computerized film scanning instructions 40 to be transferred to the film scanner 10 from the computer 20 in accordance with control signals 50 from the operator input device 24.

Figure 6:
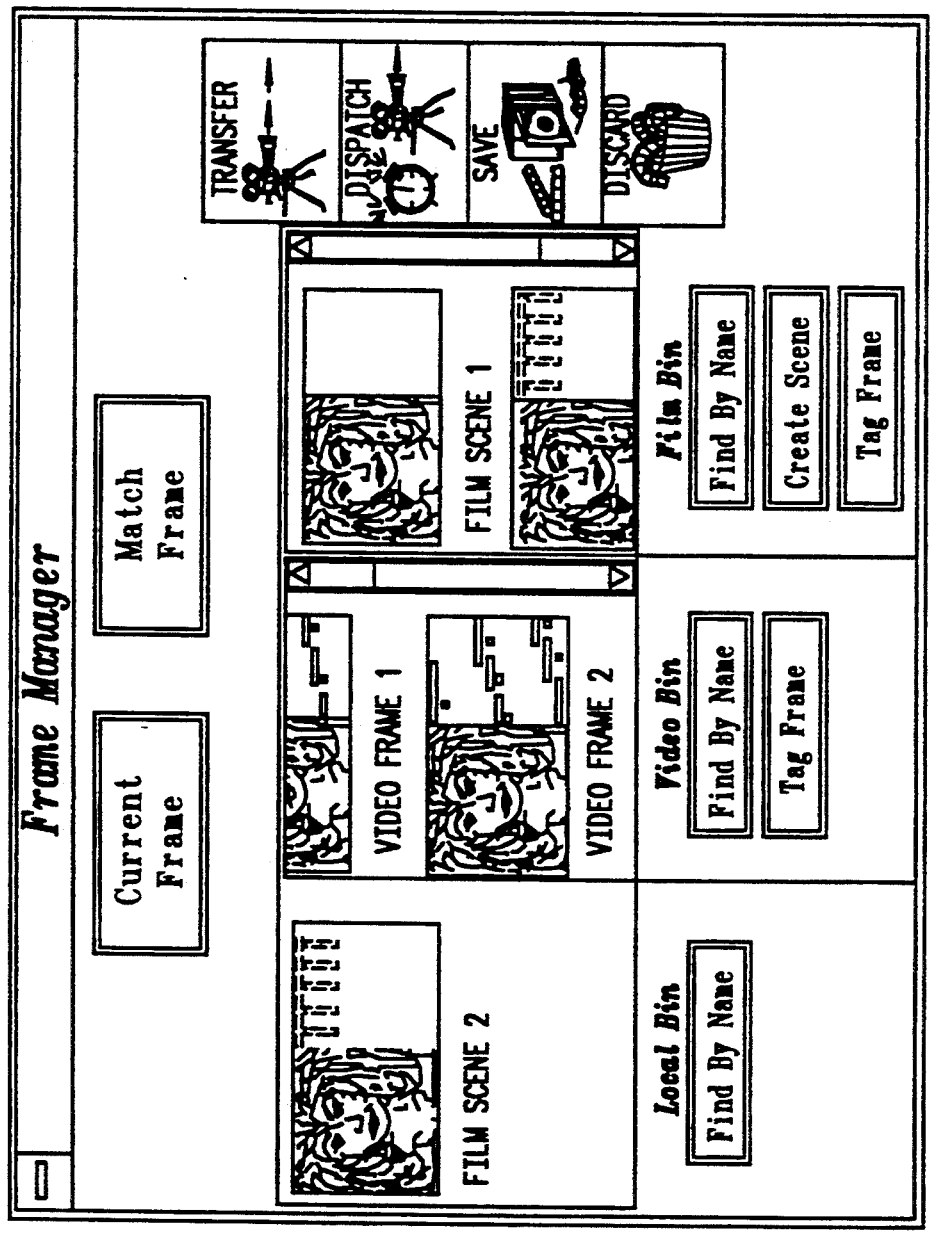
FIG. 6 illustrates a pictographic menu display used for the interactive management and control of defined frames within defined scenes within the system of FIG. 1.

Referring to FIG. 6, previously saved scene descriptions and tagged frames can be accessed through the frame manager interface. The frame manager interface facilitates access to three source bins: Film Bin; Video Bin; and Local Bin. The frame manager interface also facilitates access to six destination bins: Current Frame; Match Frame; Transfer; Dispatch; Save; and Discard. The frames and scenes are represented by icons which the operator can select with the display cursor and mouse 24b from a source bin to a destination bin. The icon consists of an image and a name therefor. For a frame icon, the image is produced by compressing the corresponding frame. For the scene icon, the image is produced by compressing one of the scene's color reference frames and using it as a representative frame within the scene.

Sliders are provided for the film and HD video source bins for traversing through the icons within those bins. A scene or frame icon can also be obtained from the list of names produced by clicking on the "Find By Name" control below each source bin. A "Tag Frame" button is provided to add the icon of the current frame to the frame manager. If the current frame is from the HD video tape, a video frame icon is placed in the HD video bin. If the source is the film, a scene icon is placed in the film bin.

Placing a scene icon into the "Current Frame" bin causes the scene to be cued and displayed on the image display 28. Placing a frame icon in the "Match Frame" bin updates the matching frame to the corresponding frame and the frame used to produce the scene icon is displayed as the matching frame. Placing a scene icon into the "Transfer" bin initiates a transfer of the corresponding scene. Moving an icon into the "Dispatch" bin "spools" any transfer(s) of the corresponding scene(s), i.e. causes the actual scene transfer(s) to be delayed so a more convenient time can be selected for the time-intensive scene transfer(s) to be performed. Placing a frame icon in the "Save" bin makes a copy of the image by copying the representative frame on a local hard disk (not shown), e.g. coupled to the computer 20. Moving an icon into the "Discard" bin removes it from the frame manager; however, any corresponding copies of the scene or frame which have been placed on the tape or on the local disk drive are preserved.

Figure 7:
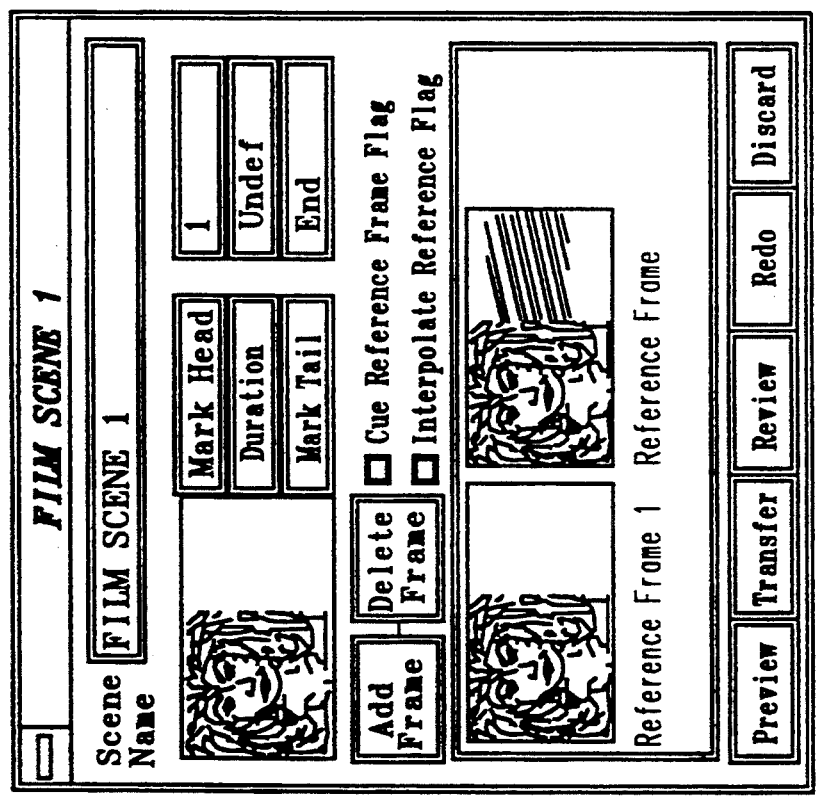
FIG. 7 illustrates a pictographic menu display used for interactive control of scene transfers within the system of FIG. 1.

Referring to FIG. 7, a diagram showing the frame makeup of each scene is provided. The name of the scene, its starting point ("Head"), its end point ("Tail"), its duration and its color reference frames can be manipulated within this diagram. The scene diagram also shows the type of interpolation (e.g. linear or "best fit") being applied between color reference frames within the scene. Linear interpolation uses a weighted average when calculating the color adjustment settings for a frame when it lies between two color reference frames. The "best fit" interpolation determines one color adjustment setting for the entire scene based upon all the color reference frames within the scene. A film map (discussed further below) depicting recorded, unrecorded and deleted film regions, scene demarcations and current film location assists in the traversal of the film reel (e.g. by the film scanner 10 of FIG. 1).

To create a scene, the operator selects the "Create Scene" button located in the frame manager interface (FIG. 6). An icon representing the new scene is added to the frame manager. The icon consists of the scene name and a compressed version of the current frame. The scene is assigned a default name (e.g. "Film Scene N"), and the currently displayed film frame becomes the default scene start point, i.e. Head. The scene Head and end point, i.e. Tail, can be changed by editing the text which displays the respective frame indices. The "Mark Head" and "Mark Tail" buttons assign the current frame index to the respective scene start and scene end indices' values. The Head index cannot exceed the Tail index. The "Add Frame" button makes the current frame a color reference frame for the current scene, if the current frame is contained within the current scene, and adds an icon to the scene's color reference bin. Selecting an icon from a scene's color reference bin will set the current color adjustment settings to the color reference values associated with the selected frame. If the "Cue Color Reference" button is activated, the selected color reference frame will also become the current frame. A reference frame selected from the scene's color reference bin can be removed using the "Delete Frame" button.

A scene can be transferred to HD video tape anytime after it has been created. "Transfer" and "Redo" buttons are provided with each scene window to initiate the scene processing. The "Redo" button transfers the scene onto the portion of the HD video tape where the scene was last transferred. The previous copy of the scene is overwritten on the HD video tape. If the scene Head or Tail is modified after a transfer, a "redo" may not be performed. The "Transfer" button causes the scene to be copied to the next available portion of the HD video tape onto which a scene has not yet been recorded during the current transfer session. The scene can be removed from the frame manager using the "Discard" button; however, this does not remove any transferred copies of the scene from the HD video tape. The "Preview" button causes a selected scene from the film to be displayed on the image display 28 for previewing without being copied onto the HD video tape. The "Review" button causes a selected scene from the HD video tape to be displayed on the image display 28 for reviewing after having been copied onto the HD video tape.

Figure 8:
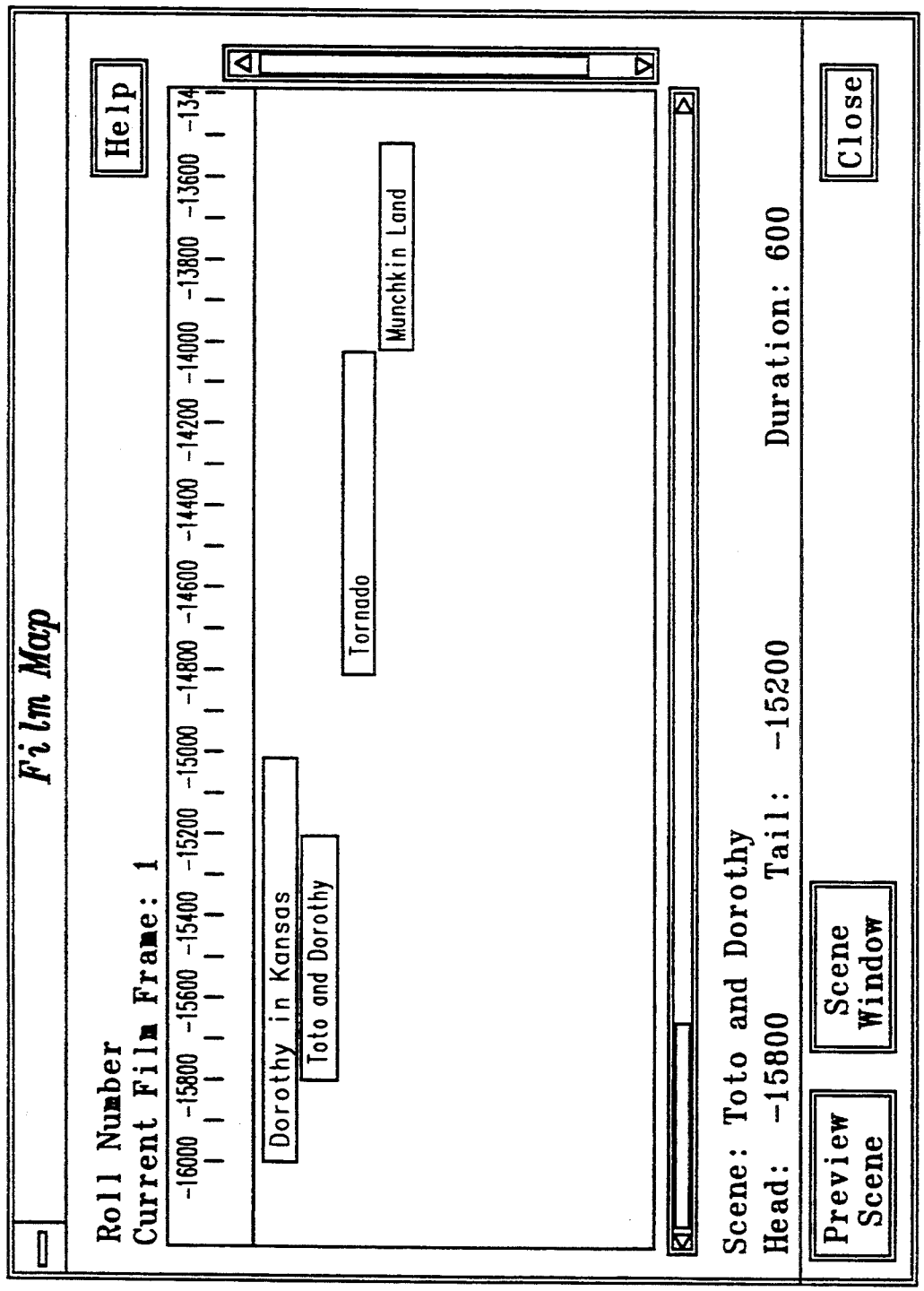
FIG. 8 illustrates a pictographic menu display representing a film map providing a visual representation of defined scenes within the system of FIG. 1.

Referring to FIG. 8, the film map provides a visual representation of the defined scenes. Scenes that are created are represented by a white bar between the start and end points of the scene. Selecting a scene will display scene information (e.g. scene's name, start and end points, and duration) below the film map. The "Preview Scene" button allows the operator to preview the currently selected scene on the image display 28; the "Scene Window" button brings up the scene window corresponding to the currently selected scene.

Figure 9A:
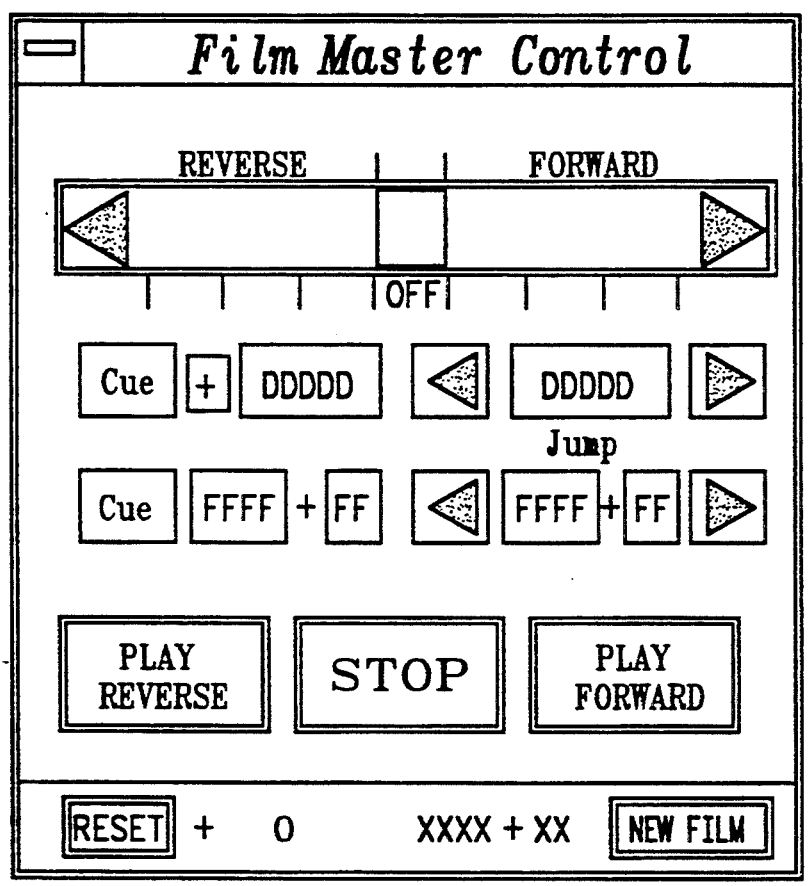
FIGS. 9A–9C illustrate pictographic menu displays used for the interactive control of the film scanner, the video framestore and video tape recorder, respectively, of FIG. 1.

Referring to FIG. 9A, using the "Film Master Control" window, the film is traversed in accordance with several types of controls. The film speed scroll bar allows the user to set the speed of the film to one of three forward speeds, one of three reverse speeds or off. The slider may be moved by clicking on the arrows at either end of the scroll region, by clicking in the scroll region on either side of the slider or by dragging the slider itself. The slider will automatically position itself to the nearest speed within the scroll region. The user may abort this function by pressing the "stop" button, the "cue" button, or by setting the film speed with the scroll bar to off or another speed.

The upper "cue" button allows the user to cue the film to the frame index in the cue text entry window laterally adjacent to the button. The film will scan, displaying the frames in gray level, and the last frame will be displayed with the current color settings. The "cue sign" button allows the user to toggle the sign of the frame number to cue the film. The button toggles between "+" and "−" when set to "+" the cue is set to a positive frame number; when set to "−" the cue is set to a negative frame number.

The cue text entry window, directly adjacent to the cue sign button, allows the user to set the frame number to cue the film. The format of the text is DDDDD where D represents a digit between 0 and 9, and DDDDD is in the range of 0–16383. The backspace key on the alphanumeric keypad 24a (FIG. 2) is used to delete the previous alphanumeric character. More than one character can be deleted by dragging the cursor over the text beginning from the end of the text string and pressing the backspace key. The insert cursor is always set to the end of the text.

The upper "jump" text entry window allows the user to set the number of frames to move the film relative to the current film position in either the reverse or the forward direction. The format of the text is DDDDD where D represents a digit between 0 and 9, and DDDDD is in the range of 0–16383. The backspace key is used to delete the previous character; more than one character can be deleted by dragging the mouse cursor over the text beginning from the end of the text string and pressing the backspace key. The insert cursor is always set to the end of the text.

The upper "jump" reverse and forward arrow buttons allow the user to move the film in the reverse or forward direction, respectively, the number of frames given in the "jump" text entry window between the arrow buttons. The film will scan, displaying the frames in gray level on the image display 28, and the last frame will be displayed with the current color settings.

The lower "cue" and "jump" text entry windows allow the user to set the film Keykode ® index of the film to which the user wishes to cue or jump. The format of the text is FFFF+FF where F represents a digit between 0 and 9, FFFF represents film footage (0000–9999) and FF represents the frame offset past the footage count (00–15 for 35 mm and 00–19 for 16 mm film). The backspace key is used to delete the previous alphanumeric character; more than one character can be deleted by dragging the cursor over the text beginning on the end of the text string and pressing the backspace key.

Keykode ® is a machine-readable edge code for motion picture film elements developed by Eastman Kodak ® in conjunction with the SMPTE in 1988. Keykode ® information is printed as a latent image bar code every half-foot on negative film stock, and printed through onto positive (print) film and some intermediate film element. This Keykode ® information is used for logging, shot identification, negative cutting from a video or workprint cut lists, and other purposes. Keykode ® is a registered trademark of Eastman Kodak ® Company.

The "play reverse" and "play forward" buttons allow the user to play the film in the reverse or forward direction, respectively, with the current color settings from the current position until another film control is activated. The user may abort this function by pressing the "stop" button, the "cue" button or by setting the film speed with the scroll bar to a variable speed. The film will scan in low speed, displaying the frames with the current color settings.

The "stop" button stops the film. The scroll bar speed is automatically positioned to the "off" position. The current frame will be displayed with the current color settings.

The "reset" button remotely resets the projector film counter. The "new film" button allows the user to access the new film set up window. The new film set up window is used to set up data for a new film reel such as the roll identification, the frame rate, the edge number, the film format, the edge number type, the film type (loads the default color parameters) and any notes the user may have.

Figure 9B:
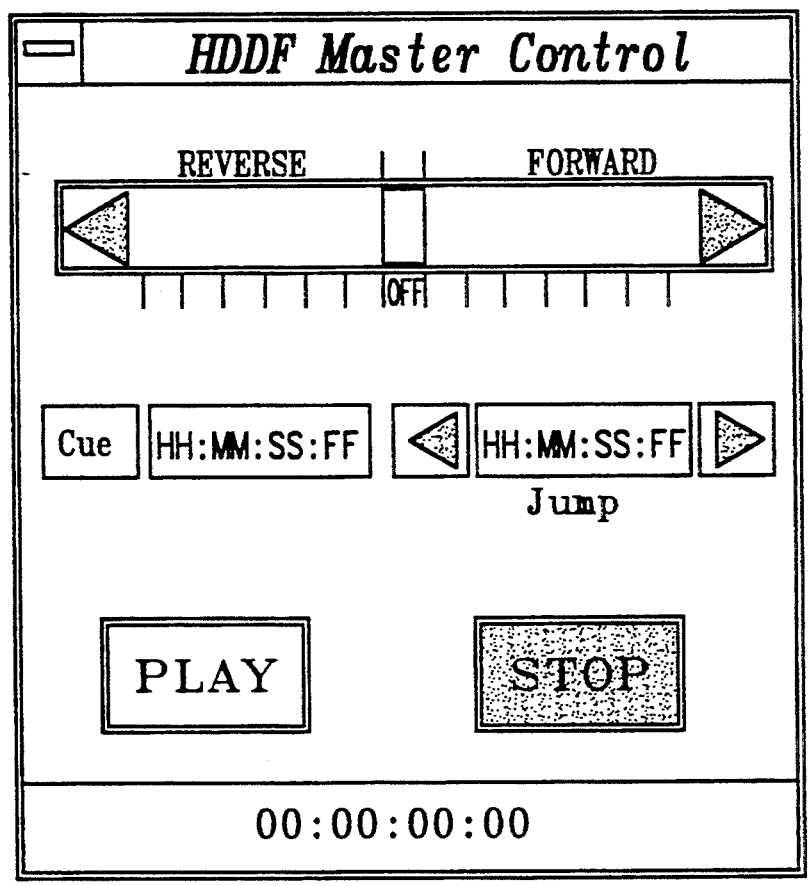

Referring to FIG. 9B, the computerized control of the video framestore 14 can be understood. The "cue" button allows the user to cue the video framestore 14 (FIG. 1) to the frame index in the "cue" text entry window (discussed further below) directly adjacent to the "cue" button. After the user activates the button, an entry verification routine checks to see if the length of the string in the text entry window is complete, and then checks the individual fields of the string. A separate error dialogue appears for each error.

The "cue" text entry window allows the user to set the frame index to cue the video framestore 14. The format of the text is HH:MM:SS:FF, where HH represents hours (00-23), MM represents minutes (00-59), SS represents seconds (00-59) and FF represents frames (00-23). The "cue" text entry window does not allow the user to either enter a non-digit character or enter more than eleven characters. If a digit is entered in a colon position, the colon is automatically entered before the digit. If a colon is entered in a digit position, the string is 0-filled up to the next colon position before the colon. The backspace key of the alphanumeric keypad 24a (FIG. 2) is used to delete the previous alphanumeric character; more than one character can be deleted by dragging the cursor over the text beginning from the end of the text string and pressing the backspace key. The insert cursor is always set to the end of the text.

The "jump" text entry window allows the user to set the frame index to move the video framestore 14 relative to the current video framestore position in either the reverse or the forward direction. The format of the text is HH:MM:SS:FF, where HH represents hours (00-23), MM represents minutes (00-59), SS represents seconds (00-59) and FF represents frames (00-23). The "jump" text entry window does not allow the user to either enter a non-digit character or enter more than 11 characters. If a digit is entered in a colon position, the colon is automatically entered before the digit. If a colon is entered in a digit position, the string is 0-filled up to the next colon position before the colon. The backspace key is used to delete the previous alphanumeric character. More than one character can be deleted by dragging the mouse cursor over the text beginning from the end of the text string and pressing the backspace key. The insert cursor is always set to the end of the text.

The "jump" reverse and forward arrow buttons allow the user to move the video framestore 14 in the reverse and forward directions, respectively, the number of frames equal to the frame index in the "jump" text entry window between the buttons. After the user activates one of the buttons, an entry verification routine checks to see if the length of the string in the text entry window is complete, and then checks the individual fields of the string. A separate error dialogue appears for each error.

The speed scroll bar allows the user to set the speed of the video framestore 14 to one of six predefined forward speeds, six reverse speeds or off. The slider may be moved by clicking on the arrows at either end of the scroll region, by clicking in the scroll region on either side of the slider or by dragging the slider itself. The slider will automatically position itself to the nearest speed within the scroll region. The user may abort this function by pressing the "stop" button, the "cue" button or by setting the speed with the scroll bar to off or another speed.

The "play" button plays the video framestore from the current position until another control is activated. The scroll bar speed is automatically positioned to the same speed as the play speed. The user may abort this function by pressing the "stop" button, the "cue" button or by setting the speed with the scroll bar to a speed other than the play speed.

The "stop" button stops the video framestore 14. The scroll bar speed is automatically positioned to the off position.

Figure 9C:
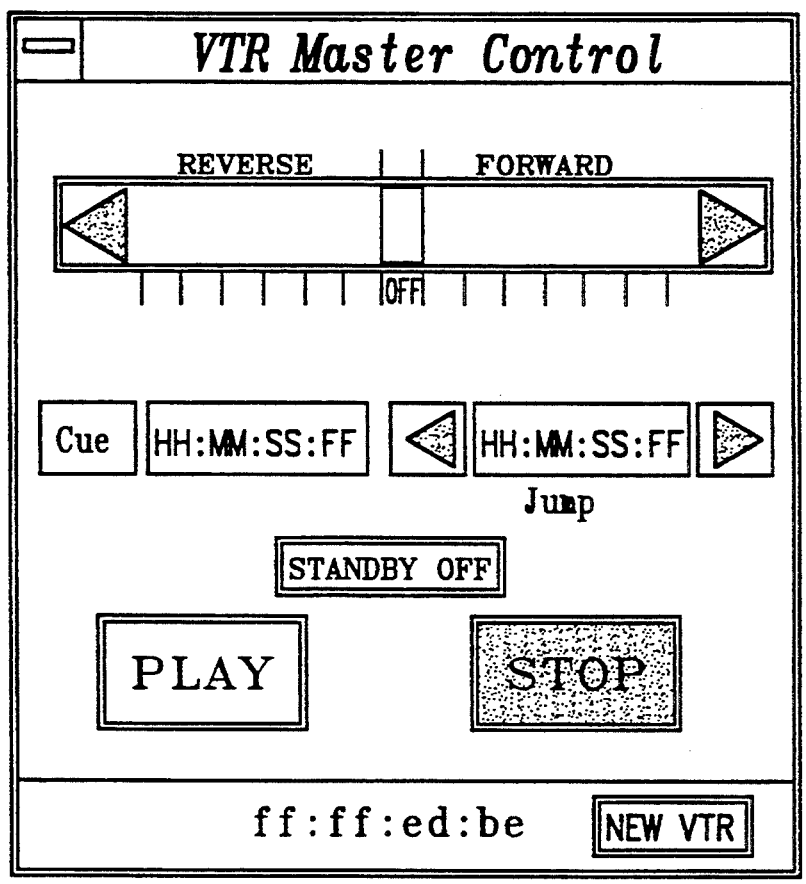

Referring to FIG. 9C, the HD video tape is traversed in accordance with several types of controls. The speed scroll bar allows the user to set the speed of the video tape recorder 16 to one of six forward speeds, six reverse speeds or off. The slider may be moved by clicking on the arrows at either end of the scroll region, by clicking within the scroll region on either side of the slider or by dragging the slider itself. The slider will automatically position itself to the nearest speed within the scroll region. The user may abort this function by pressing the "stop" button, the "cue" button or by setting the speed with the scroll bar to off or another speed.

The "cue" button allows the user to cue the video tape recorder 16 to the frame index within the "cue" text entry window directly adjacent to the button. After the user activates the button, an entry verification routine checks to see if the length of the string within the text entry window is complete, and then checks the individual fields of the string. A separate error dialogue appears for each error.

The "cue" text entry window allows the user to set the frame index to cue the video tape recorder 16. The format of the text is HH:MM:SS:FF, where HH represents hours (00-23), MM represents minutes (00-59), SS represents seconds (00-59) and FF represents frames (00-23). The "cue" text entry window does not allow the user to either enter a non-digit character or enter more than 11 characters. If a digit is entered in a colon position, the colon is automatically entered before the digit. If a colon is entered in a digit position, the string is 0-filled up to the next colon position before the colon. The backspace key on the alphanumeric keypad 24a (FIG. 2) is used to delete the previous alphanumeric character. More than one character can be deleted by dragging the cursor over the text beginning from the end of the text string and pressing the backspace key. The insert cursor is always set to the end of the text.

The "jump" text entry window allows the user to set the number of frames to move the video tape recorder 16 relative to the current position in either the reverse or the forward direction. The format of the text is HH:MM:SS:FF, where HH represents hours (00–23), MM represents minutes (00–59), SS represents seconds (00–59) and FF represents frames (00–23). The "jump" text entry window does not allow the user to either enter a non-digit character or enter more than 11 characters. If a digit is entered in a colon position, the colon is automatically entered before the digit. If a colon is entered in a digit position, the string is 0-filled up to the next colon position before the colon. The backspace key is used to delete the previous alphanumeric character. More than one character can be deleted by dragging the cursor over the text beginning from the end of the text string and pressing the backspace key. The insert cursor is always set to the end of the text.

The "jump" reverse and forward arrow buttons allow the user to move the video tape recorder 16 in the reverse and forward direction, respectively, the number of frames given in the "jump" text entry window between the buttons. After the user activates one of the buttons, an entry verification routine checks to see if the length of the string within the text entry window is complete, and then checks the individual fields of the string. A separate error dialogue appears for each error.

The "play" button causes the video tape recorder 16 to play from its current position until another control is activated. The scroll bar speed is automatically positioned to the same speed as the play speed. The user may abort this function by pressing the "stop" button, the "cue" button or by setting the speed with the scroll bar to a speed other than the play speed.

The "stop" button stops the video tape recorder 16 from playing. The scroll bar speed is automatically positioned to the "off" position. The "standby" button puts the video tape recorder 16 in a standby mode by turning off the capstan (not shown).

The "new VTR" button allows the user to access the "new VTR" setup window. The "new VTR" setup window is used to set up data for a new video tape, such as the video tape recorder identification, the in-point reference frame (the point at which the transfers are to begin), the pre-roll time and video tape recorder command delay time, and any notes the user may have.

Figure 10:
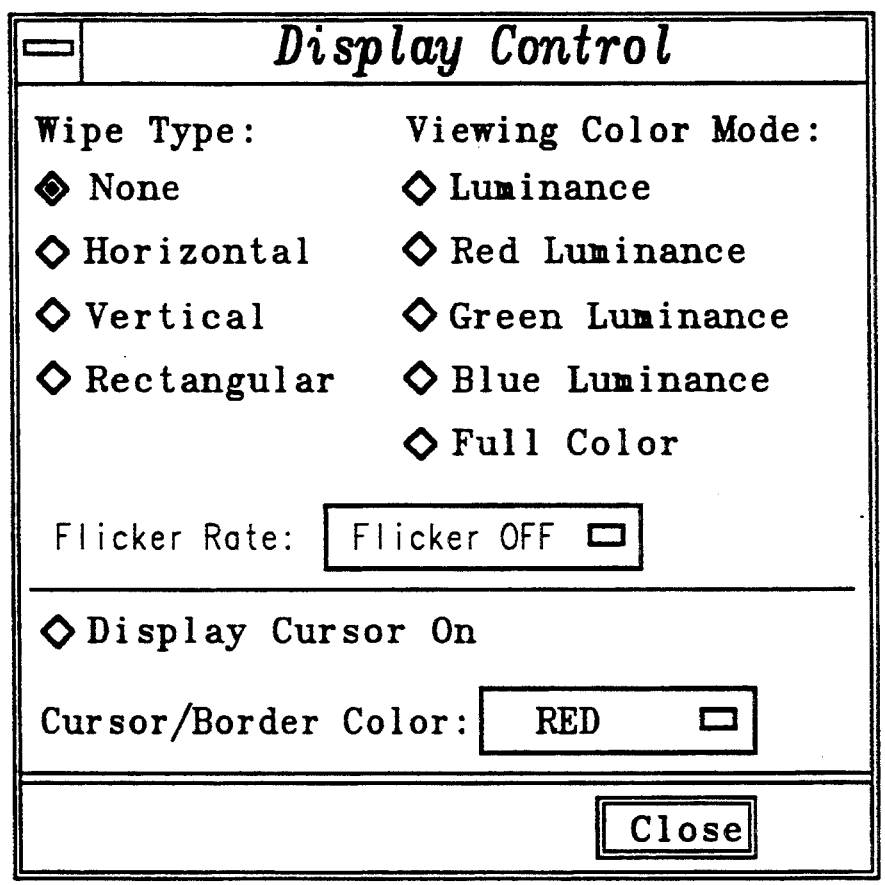
FIG. 10 illustrates a pictographic menu display used in the interactive control of displayed video images in the system of FIG. 1.
Figure 11:
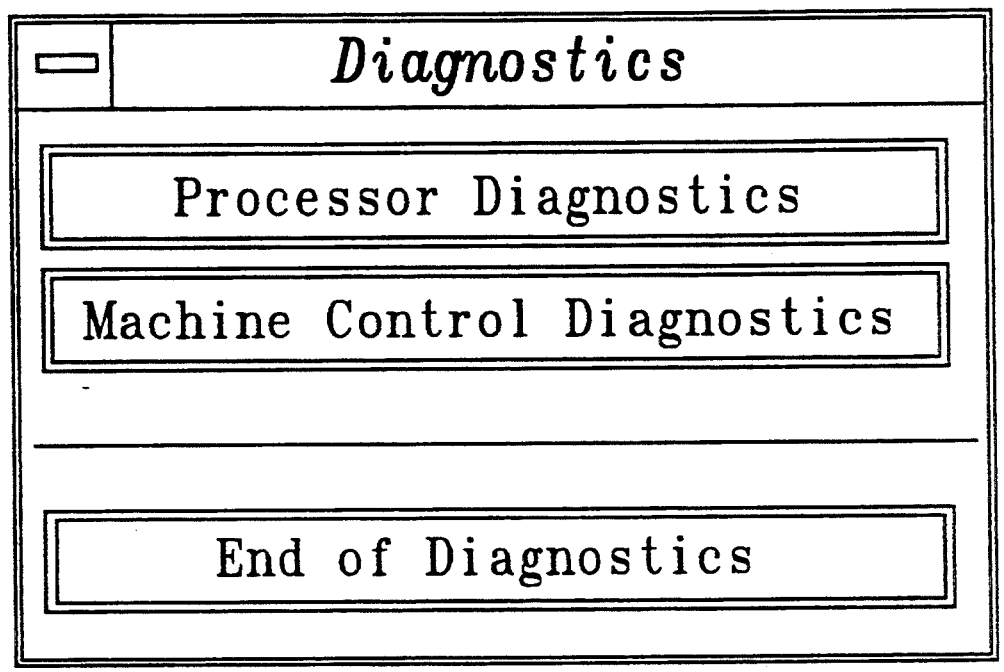
FIG. 11 illustrates a pictographic menu display used in the interactive control of diagnostic testing of the system of FIG. 1.
Figure 12:
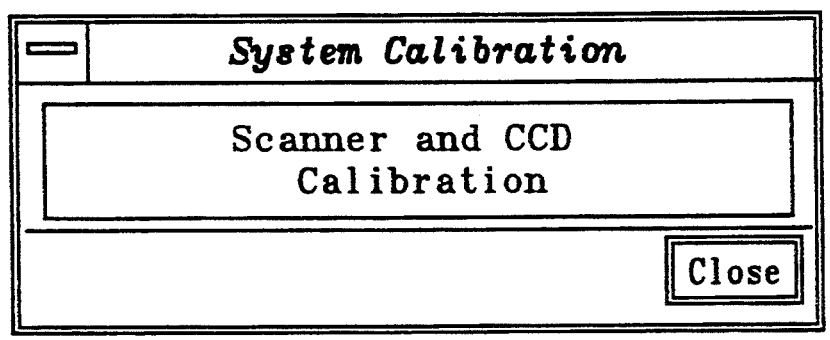
FIG. 12 illustrates a pictographic menu display used in the interactive control of the calibration of the system of FIG. 1.

As discussed immediately below, FIGS. 10–12 illustrate various pictographic menu displays depicting various operator control commands which correspond to computerized signal processing control data 42 to be transferred to the video signal processor 12, computerized video storage and retrieval instructions 44 and 46 to be transferred to the video framestore 14 and video tape recorder 16, respectively, and computerized film scanning instructions 40 to be transferred to the film scanner 10, all from the computer 20 in accordance with control signals 50 from the operator input device 24.

Referring to FIG. 10, display controls manipulate the video display wipe type and the video display color channels. The "Wipe Type" control allows the operator to choose a horizontal, vertical or rectangular wipe, or no wipe at all. Wipe edges are moved by selecting an edge and moving it to the new desired location using the display cursor and mouse 24b (FIG. 1). The operator may select one or all color channels to be displayed on the image display 28 in gray-scale, full color or selected single colors using the "Viewing Color Mode" control. Highlight color can be added and removed from the wipe edge using the "Highlight Wipe" button. The "Flicker Rate" control sets the rate at which the two wipe regions are toggled. The "Display Cursor On" control toggles the cursor on the image display 28. The "Cursor/Border Color" control sets the color of the cursor and wipe border on the image display 28.

Referring to FIG. 11, the video signal processor 12 and the various machine controls (e.g. for the film scanner 10, video framestore 14 and video tape recorder 16) can be individually tested by activating the "Processor Diagnostics" or "Machine Control Diagnostics" control respectively. During testing, the system output 38 is displayed on both the image display 28 and a video waveform monitor (not shown). Activating the "End of Diagnostics" control will end whichever diagnostic test is currently in progress.

Referring to FIG. 12, calibration is done by establishing pixel-by-pixel calibration of the film scanner 10 (FIG. 1) and establishing a default set of color adjustment settings. After the operator loads a telecine test film into the film scanner 10, scanner calibration is accomplished in two steps following activation of the "Scanner and CCD Calibration" control. The first step is setting the reference black level, which requires the imager lens of the film scanner 10 to be capped. The second step is setting pixel-by-pixel gain, which requires the cap to be removed from the lens and the telecine test film to be moved to a reference white frame.

Once the scanner has been calibrated, the operator moves the telecine test film to a desired test pattern frame. The color adjustment controls are manipulated as discussed above (FIGS. 5A–5D). A set of images corresponding to the telecine test film reference patterns is stored in the Local bin (FIG. 6) and may be loaded as matching frames to aid in the calibration process. Once a satisfactory adjustment has been achieved, the default color adjustment values are set to the current color adjustment settings. The operator then removes the test reel and loads the desired transfer reel of film. The operator then moves the film scanner 10 to a selected frame, sets it as a "zero" frame reference and sets a frame index. The indices of all of the frames will be relative to this index.

Figure 13:
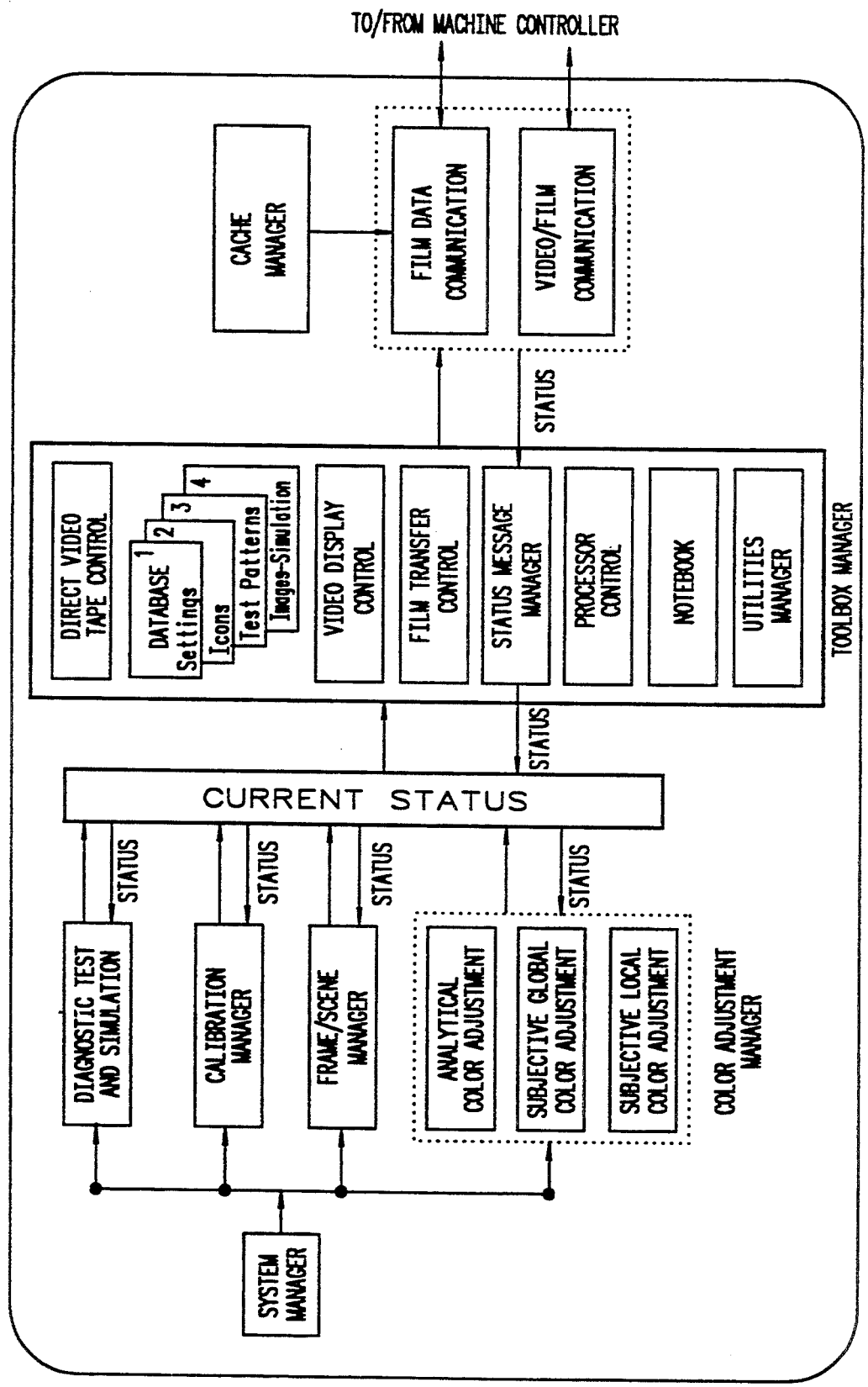
FIG. 13 is a functional block diagram of the software architecture for the system of FIG. 1.

Referring to FIG. 13, the software architecture for the computer 20 is designed using the software modules as shown. The "System Manager," comprising the main loop of the software, keeps track of the sequence of menus that have been used and performs system administration functions. Further, it initializes the system, handles the shutdown procedure (e.g. saving the current state and freeing memory) and handles the wakeup procedure (e.g. restoring the current state and reallocating memory).

The "Diagnostic Test and Simulation" sets up the diagnostic test modules to test out the software for the computer 20 and the hardware. Further, it loads images used for simulation into the simulation images database (discussed further below).

The "Calibration Manager" uses the "tool" entitled "Processor Control" in the "Toolbox Manager" (discussed further below) to set up the commands to send to the video signal processor 12 for testing its hardware functions (assuming the image display 28, the switch 18 and the waveform monitor (not shown) are calibrated). Further, it formats and sends commands for performing calibration of the film scanner 10 (discussed above).

The "Frame/Scene Manager" uses tools from the Toolbox Manager (discussed further below) to handle all frame and scene management, and generates the appropriate high level commands corresponding to the current system mode and user input. Further, it manages the frame manager and scene menu controls, updates the current status record and keeps track of current frame status, updates the database list structures, and performs a database search and query.

The "Color Adjustment Manager" performs a number of functions. The "Analytical Color Adjustment" allows direct access to film color settings parameters for the video signal processor 12. "Subjective Global Color Adjustment" allows global adjustments of color for hue, saturation, value, pedestal, gain and gamma. "Subjective Local Color Adjustment" allows local adjustments of the color space using a conical model, with which the user may select a pixel on the image display 28 and modify hue, saturation and value of that selected pixel. Further, the Color Adjustment Manager allows the user to make color adjustments using other color model representations, such as RGB or CIE. It also saves currently displayed color adjustment parameters with a user-specified name to an external predefined file, retrieves color adjustment parameters from an existing external file, and uses tools from the Toolbox Manager (discussed further below) to handle all color adjustments and generates the appropriate commands corresponding to the current user request.

The Toolbox Manager also provides a number of functions. "Direct Video Tape Control" formats all direct video tape movement commands, handles video tape recorder status requests, formats all direct framestore movement commands and handles framestore status requests.

The "Database" tool has four distinct databases: settings; icons; test patterns; and images (for simulation). The Database tool stores frames and scenes, and system and color information for direct access by Diagnostic Test and Simulation, Calibration Manager, Frame/Scene Manager and Color Adjustment Manager. Further, it manipulates the data elements within linked lists.

"Video Display Control" formats video display control commands. "Notebook" handles user-generated notebook logs.

"Film Transfer Control" synchronizes commands and film frame color settings, formats and transfers film-to-video transfer commands, and formats all direct film movement commands and the film-to-video transfer commands. Further, it handles status requests from the film scanner 10.

"Processor Control" formats control commands for the video signal processor 12. "Utilities Manager" provides on-line help for selected functions, and provides transfer status.

"Status Message Manager" formats status messages received from the video signal processor 12 and displays them on the control display 26. Further, it writes status messages to a status message file for diagnostics, and sets message access control for filtering out specified message classes.

"Video/Film Communication" provides communication interfacing for the machine control commands 40, 42, 44, 46, 48 and receives status information. "Film Data Communication" provides high speed data interfacing to the video signal processor 12, formats data commands, receives status information and formats commands for the video signal processor 12.

This interfacing performed by Video/Film Communication and Film Data Communication can be accomplished under the control of a machine controller (not shown) containing a microprocessor programmed according to any of many well known techniques for formatting and transferring the aforementioned data, commands and status information. As should be understood, such formatting and transferrence of data, commands and status information will be dependent largely upon the particular hardware selected to perform the functions of the film scanner 10, video signal processor 12, video framestore 14, video tape recorder 16 and video switch 18.

"Cache Manager" handles all caching functions for film data communications, performs interpolation calculations for color frame settings during film-to-video transfers, and performs best-fit calculations for color frame settings during film-to-video transfers. Further, it provides the video signal processor 12 with color settings of upcoming frames, and ensures that the video signal processor 12 is appropriately updated with color settings during a play or transfer operation.

The software modules for the computer 20 can be designed for performance in accordance with the foregoing discussion using conventional "object-oriented" programming techniques. In a preferred embodiment of the present invention, the above-described software modules were designed as object-oriented programs using the C++ programming language. Such programs can be designed in accordance with the teachings found in a book (incorporated herein by reference) entitled "A C++ Primer," authored by Stanley B. Lippman, copyrighted in 1989 by AT&T Bell Laboratories and published by Addison-Wesley Publishing Company in 1990.

Thus, a computerized interactive menu-driven video signal processing apparatus and method in accordance with the present invention provides an ergonomic means for providing an operator interface with interactive feedback for selectively controlling the conversion of color film images to HD video tape, and the signal processing of the associated video information. This control is achieved through a computerized interactive operator interface apparatus and method, as discussed above.

It should be understood that various alternatives to the embodiments of the present invention described herein can be employed in practicing the present invention. It is intended that the following claims define the scope of the present invention, and that structures and methods within the scope of these claims and their equivalents be covered thereby.

What is claimed is:

1. A computerized film-to-video signal processor with an interactive menu-driven operator control interface comprising:

processor means for receiving computerized signal processing control data and for coupling to a film scanner and receiving therefrom a video signal which represents a scanned optical film image, and for selectively processing said received video signal in accordance with said received computerized signal processing control data; and computer means for providing a first operator feedback signal representing a first pictographic menu display depicting a first operator control command corresponding to said computerized signal processing control data, for receiving a first control signal corresponding to said first operator control command, and for providing said computerized signal processing control data to said processor means in accordance with said received first control signal.

2. A computerized film-to-video signal processor as recited in claim 1, further comprising menu display means for receiving said first operator feedback signal from said computer means and displaying said first pictographic menu display.

3. A computerized film-to-video signal processor as recited in claim 1, further comprising operator input means for selectively providing said first control signal to said computer means.

4. A computerized film-to-video signal processor as recited in claim 1, further comprising image display means for receiving and displaying said selectively processed video signal from said processor means.

5. A computerized film-to-video signal processor as recited in claim 1, wherein said computer means further provides a second operator feedback signal representing a second pictographic menu display depicting a second operator control command corresponding to computerized video storage and retrieval instructions, receives a second control signal corresponding to said second operator control command, and provides said computerized video storage and retrieval instructions in accordance with said received second control signal.

6. A computerized film-to-video signal processor as recited in claim 1, wherein said computer means further provides a second operator feedback signal representing a second pictographic menu display depicting a second operator control command corresponding to a computerized film scanning instruction, receives a second control signal corresponding to said second operator control command, and provides said computerized film scanning instruction for said film scanner in accordance with said received second control signal.

7. A computerized film-to-video signal processor as recited in claim 3, wherein said operator input means comprises a computer mouse.

8. A computerized film-to-video signal processor as recited in claim 5, further comprising video storage and retrieval means for receiving said computerized video storage instruction and in accordance therewith receiving and storing said selectively processed video signal from said processor means, and for receiving said computerized video retrieval instruction and in accordance therewith retrieving and outputting said stored, selectively processed video signal.

9. A computerized film-to-video signal processor as recited in claim 6, further comprising scanner means for receiving said computerized film scanning instruction and in accordance therewith scanning an optical film image, and further for providing said video signal, wherein said video signal represents said scanned optical film image.

10. A computerized film-to-video signal storage and retrieval device with an interactive menu-driven operator control interface, comprising:
video storage and retrieval means for coupling to a film scanner and receiving therefrom a video signal which represents a scanned optical film image, for receiving a computerized video storage instruction and in accordance therewith storing said video signal, and
for receiving a computerized video retrieval instruction and in accordance therewith retrieving and outputting said stored video signal; and
computer means for providing a first operator feedback signal representing a first pictographic menu display depicting a first operator control command corresponding to said computerized video storage and retrieval instructions, for receiving a first control signal corresponding to said first operator control command, and for providing said computerized video storage and retrieval instructions to said video storage and retrieval means in accordance with said received first control signal, wherein said computerized video storage and retrieval instructions selectively represent defined video scenes and frames.

11. A computerized film-to-video signal storage and retrieval device as recited in claim 10, further comprising menu display means for receiving said first operator feedback signal from said computer means and displaying said first pictographic menu display.

12. A computerized film-to-video signal storage and retrieval device as recited in claim 10, further comprising operator input means for selectively providing said first control signal to said computer means.

13. A computerized film-to-video signal storage and retrieval device as recited in claim 10, further comprising image display means for receiving and displaying said retrieved and outputted video signal from said video storage and retrieval means.

14. A computerized film-to-video signal storage and retrieval device as recited in claim 10, wherein said computer means further provides a second operator feedback signal representing a second pictographic menu display depicting a second operator control command corresponding to a computerized film scanning instruction, receives a second control signal corresponding to said second operator control command, and provides said computerized film scanning instruction for said film scanner in accordance with said received second control signal.

15. A computerized film-to-video signal storage and retrieval device as recited in claim 10, wherein said computer means further provides a second operator feedback signal representing a second pictographic menu display depicting a second operator control command corresponding to computerized signal processing control data, receives a second control signal corresponding to said second operator control command, and provides said computerized signal processing control data in accordance with said received second control signal.

16. A computerized film-to-video signal storage and retrieval device as recited in claim 12, wherein said operator input means comprises a computer mouse.

17. A computerized film scanner with an interactive menu-driven operator control interface, comprising:
scanner means for receiving a computerized film scanning instruction and in accordance therewith scanning an optical film image, and for providing a video signal representing said scanned optical film image; and
computer means for providing a first operator feedback signal representing a first pictographic menu display depicting a first operator control command corresponding to said computerized film scanning instruction, for receiving a first control signal corresponding to said first operator control command, and for providing said computerized film scanning instruction to said scanner means in accordance with said received first control signal, wherein said computerized film scanning instruction selectively represents defined film scenes and frames.

18. A computerized film scanner as recited in claim 17, further comprising menu display means for receiving said first operator feedback signal from said computer means and displaying said first pictographic menu display.

19. A computerized film scanner as recited in claim 17, further comprising operator input means for selectively providing said first control signal to said computer means.

20. A computerized film scanner as recited in claim 17, wherein said computer means further provides a second operator feedback signal representing a second pictographic menu display depicting a second operator control command corresponding to computerized signal processing control data, receives a second control signal corresponding to said second operator control command, and provides said computerized signal processing control data in accordance with said received second control signal.

21. A computerized film scanner as recited in claim 17, wherein said computer means further provides a second operator feedback signal representing a second pictographic menu display depicting a second operator control command corresponding to computerized video storage and retrieval instructions, receives a second control signal corresponding to said second operator control command, and provides said computerized video storage and retrieval instructions in accordance with said received second control signal.

22. A computerized film scanner as recited in claim 19, wherein said operator input means comprises a computer mouse.

23. A computerized film-to-video converter and signal processor with an interactive menu-driven operator control interface, comprising:
 scanner means for receiving a computerized film scanning instruction and in accordance therewith scanning an optical film image, and for providing a video signal representing said scanned optical film image;
 processor means for receiving computerized signal processing control data and said video signal, and for selectively processing said received video signal in accordance with said received computerized signal processing control data;
 video storage and retrieval means for receiving a computerized video storage instruction and in accordance therewith receiving and storing said selectively processed video signal, and for receiving a computerized video retrieval instruction and in accordance therewith retrieving and outputting said stored, selectively processed video signal; and
 computer means for providing a plurality of operator feedback signals selectively representing a plurality of pictographic menu displays depicting a plurality of operator control commands corresponding to said computerized film scanning instruction, said computerized signal processing control data and said computerized video storage and retrieval instructions, and for receiving a plurality of control signals corresponding to said plurality of operator control commands, and further for selectively providing said computerized film scanning instruction, said computerized signal processing control data and said computerized video storage and retrieval instructions to said scanner means, said processor means, and said video storage and retrieval means, respectively, in accordance with said received plurality of control signals, wherein said computerized film scanning instruction and said computerized video storage and retrieval instructions selectively represent defined film and video scenes and frames, respectively.

24. A computerized film-to-video converter and signal processor as recited in claim 23, further comprising menu display means for receiving said plurality of operator feedback signals from said computer means and selectively displaying said plurality of pictographic menu displays.

25. A computerized film-to-video converter and signal processor as recited in claim 23, further comprising operator input means for selectively providing said plurality of control signals to said computer means.

26. A computerized film-to-video converter and signal processor as recited in claim 23, further comprising image display means for selectively receiving and displaying said selectively processed video signal from said processor means and said retrieved and outputted, selectively processed video signal from said video storage and retrieval means.

27. A computerized film-to-video converter and signal processor as recited in claim 25, wherein said operator input means comprises a computer mouse.

28. An interactive menu-driven film-to-video signal processing method, comprising the steps of:
 receiving computerized signal processing control data;
 receiving from a film scanner a video signal representing a scanned optical film image;
 selectively processing said video signal in accordance with said computerized signal processing control data;
 providing a first operator feedback signal representing a first pictographic menu display depicting a first operator control command corresponding to said computerized signal processing control data;
 receiving a first control signal corresponding to said first operator control command; and
 providing said computerized signal processing control data in accordance with said first control signal.

29. An interactive menu-driven film-to-video signal processing method as recited in claim 28, further comprising the steps of receiving said first operator feedback signal and displaying said first pictographic menu display.

30. An interactive menu-driven film-to-video signal processing method as recited in claim 28, further comprising the step of selectively providing said first control signal via a computer mouse.

31. An interactive menu-driven film-to-video signal processing method as recited in claim 28, further comprising the steps of receiving and displaying said selectively processed video signal.

32. An interactive menu-driven film-to-video signal processing method as recited in claim 28, further comprising the steps of:
 providing a second operator feedback signal representing a second pictographic menu display depicting a second operator control command corresponding to computerized video storage and retrieval instructions;
 receiving a second control signal corresponding to said second operator control command; and
 providing said computerized video storage and retrieval instructions in accordance with said second control signal.

33. An interactive menu-driven film-to-video signal processing method as recited in claim 28, further comprising the steps of:
provide a second operator feedback signal representing a second pictographic menu display depicting a second operator control command corresponding to a computerized film scanning instruction;
receiving a second control signal corresponding to said second operator control command; and
providing said computerized film scanning instruction for use by a film scanner in accordance with said second control signal.

34. An interactive menu-driven film-to-video signal processing method as recited in claim 32, further comprising the steps of:
receiving said computerized video storage instruction and in accordance therewith receiving and storing said selectively processed video signal; and
receiving said computerized video retrieval instruction and in accordance therewith retrieving and outputting said stored, selectively processed video signal.

35. An interactive menu-driven film-to-video signal processing method as recited in claim 33, further comprising the steps of:
receiving said computerized film scanning instruction and in accordance therewith scanning an optical film image; and
providing said video signal, wherein said video signal represents said scanned optical film image.

36. An interactive menu-driven film-to-video signal storage and retrieval method, comprising the steps of:
receiving a computerized video storage instruction;
receiving from a film scanner a video signal representing a scanned optical film image;
receiving a computerized video retrieval instruction and in accordance therewith retrieving and outputting said stored video signal;
providing a first operator feedback signal representing a first pictographic menu display depicting a first operator control command corresponding to said computerized video storage and retrieval instructions;
receiving a first control signal corresponding to said first operator control command; and
providing said computerized video storage and retrieval instructions in accordance with said first control signal, wherein said computerized video storage and retrieval instructions selectively represent defined video scenes and frames.

37. An interactive menu-driven film-to-video signal storage and retrieval method as recited in claim 36, further comprising the steps of receiving said first operator feedback signal and displaying said first pictographic menu display.

38. An interactive menu-driven film-to-video signal storage and retrieval method as recited in claim 36, further comprising the step of selectively providing said first control signal via a computer mouse.

39. An interactive menu-driven film-to-video signal storage and retrieval method as recited in claim 36, further comprising the steps of receiving and displaying said retrieved and outputted video signal.

40. An interactive menu-driven film-to-video signal storage and retrieval method as recited in claim 36, further comprising the steps of:
providing a second operator feedback signal representing a second pictographic menu display depicting a second operator control command corresponding to a computerized film scanning instruction;
receiving a second control signal corresponding to said second operator control command; and
providing said computerized film scanning instruction for use by a film scanner in accordance with said second control signal.

41. An interactive menu-driven film-to-video signal storage and retrieval method as recited in claim 36, further comprising the steps of:
providing a second operator feedback signal representing a second pictographic menu display depicting a second operator control command corresponding to computerized signal processing control data;
receiving a second control signal corresponding to said second operator control command; and
providing said computerized signal processing control data in accordance with said second control signal.

42. An interactive menu-driven film scanning method, comprising the steps of:
receiving a computerized film scanning instruction and in accordance therewith scanning an optical film image;
providing a video signal representing said scanned optical film image;
providing a first operator feedback signal representing a first pictographic menu display depicting a first operator control command corresponding to said computerized film scanning instruction;
receiving a first control signal corresponding to said first operator control command; and
providing said computerized film scanning instruction in accordance with said first control signal, wherein said computerized film scanning instruction selectively represents defined film scenes and frames.

43. An interactive menu-driven film scanning method as recited in claim 42, further comprising the steps of receiving said first operator feedback signal and displaying said first pictographic menu display.

44. An interactive menu-driven film scanning method as recited in claim 42, further comprising the step of selectively providing said first control signal via a computer mouse.

45. An interactive menu-driven film scanning method as recited in claim 42, further comprising the steps of:
providing a second operator feedback signal representing a second pictographic menu display depicting a second operator control command corresponding to computerized signal processing control data;
receiving a second control signal corresponding to said second operator control command; and
providing said computerized signal processing control data in accordance with said second control signal.

46. An interactive menu-driven film scanning method as recited in claim 42, further comprising the steps of:
providing a second operator feedback signal representing a second pictographic menu display depicting a second operator control command corresponding to computerized video storage and retrieval instructions;

receiving a second control signal corresponding to said second operator control command; and providing said computerized video storage and retrieval instructions in accordance with said second control signal.

47. An interactive menu-driven film-to-video conversion and signal processing method, comprising the steps of:

receiving a computerized film scanning instruction and in accordance therewith scanning an optical film image;

providing a video signal representing said scanned optical film image;

receiving computerized signal processing control data and said video signal;

selectively processing said video signal in accordance with said computerized signal processing control data;

receiving a computerized video storage instruction and in accordance therewith receiving and storing said selectively processed video signal;

receiving a computerized video retrieval instruction and in accordance therewith retrieving and outputting said stored, selectively processed video signal;

providing a plurality of operator feedback signals selectively representing a plurality of pictographic menu displays depicting a plurality of operator control commands corresponding to said computerized film scanning instruction, said computerized signal processing control data, and said computerized video storage and retrieval instructions;

receiving a plurality of control signals corresponding to said plurality of operator control commands; and selectively providing said computerized film scanning instruction, said computerized signal processing control data and said computerized video storage and retrieval instructions in accordance with said plurality of control signals, wherein said computerized film scanning instruction and said computerized video storage and retrieval instructions selectively represent defined film and video scenes and frames, respectively.

48. An interactive menu-driven film-to-video conversion and signal processing method as recited in claim 47, further comprising the steps of receiving said plurality of operator feedback signals and selectively displaying said plurality of pictographic menu displays.

49. An interactive menu-driven film-to-video conversion and signal processing method as recited in claim 47, further comprising the step of selectively providing said plurality of control signals via a computer mouse.

50. An interactive menu-driven film-to-video conversion and signal processing method as recited in claim 47, further comprising the steps of selectively receiving and displaying said selectively processed video signal and said retrieved and outputted, selectively processed video signal.

* * * * *